US012699848B2

(12) United States Patent
Galvin

(10) Patent No.: US 12,699,848 B2
(45) Date of Patent: Aug. 4, 2026

(54) SYSTEMS AND METHODS FOR GENERATIVE VIDEO RECONSTRUCTION USING MULTIMODAL LATENT SENSOR DATA

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/390,468

(22) Filed: Nov. 14, 2025

(65) Prior Publication Data

US 2026/0203514 A1      Jul. 16, 2026

Related U.S. Application Data

(63) Continuation-in-part of application No. 19/380,869, filed on Nov. 5, 2025, which is a continuation-in-part
(Continued)

(51) Int. Cl.
*G06F 40/30*          (2020.01)
*G06F 16/332*        (2019.01)
*G06F 16/3329*      (2025.01)

(52) U.S. Cl.
CPC .......... *G06F 40/30* (2020.01); *G06F 16/3325* (2019.01); *G06F 16/3329* (2019.01)

(58) Field of Classification Search
CPC ... G06F 40/30; G06F 16/3329; G06F 16/3325
(Continued)

(56) References Cited

U.S. PATENT DOCUMENTS 6,728,413 B2    4/2004  Onno
7,629,922 B2    12/2009  Winstead et al.
(Continued)

OTHER PUBLICATIONS

Piechocki et al. Multimodal sensor fusion in the latent representation space, arXiv:2208.02183v1 (Year: 2022).*
(Continued)

*Primary Examiner* — Dominic D Saltarelli
(74) *Attorney, Agent, or Firm* — GALVIN PATENT LAW LLC; Brian R. Galvin; Erin L. Johnston

(57) ABSTRACT

A system and method for generating synthetic video from diverse sensor inputs within a unified computational framework. The system receives heterogeneous data such as acoustic, thermal, and textual streams, encodes each into modality-specific latent representations, and projects them into a shared geometric manifold. Within this manifold, convergence points known as multimodal landmarks are established and used to compute geodesic trajectories that describe relationships among the inputs. The trajectories are verified for reversibility to ensure that forward and reverse mappings remain consistent. A Lorentzian autoencoder then decodes the validated trajectories into temporally coherent video sequences derived from the multimodal evidence rather than reconstructed imagery. The system records geometric states for auditability and persistently stores the resulting landmarks and trajectories for reuse, enabling reversible, verifiable generation of synthetic video that accurately reflects the integrated sensor data.

18 Claims, 11 Drawing Sheets

Related U.S. Application Data of application No. 19/369,319, filed on Oct. 26, 2025, which is a continuation-in-part of application No. 19/363,675, filed on Oct. 21, 2025, which is a continuation-in-part of application No. 19/351,286, filed on Oct. 6, 2025, said application No. 19/380,869 is a continuation-in-part of application No. 19/329,369, filed on Sep. 15, 2025, which is a continuation-in-part of application No. 19/328,199, filed on Sep. 14, 2025, now Pat. No. 12,645,884, which is a continuation-in-part of application No. 19/328,179, filed on Sep. 14, 2025, said application No. 19/369,319 is a continuation-in-part of application No. 19/328,179, filed on Sep. 14, 2025, said application No. 19/328,199 is a continuation-in-part of application No. 19/328,103, filed on Sep. 13, 2025, now Pat. No. 12,639,521, said application No. 19/328,179 is a continuation-in-part of application No. 19/326,730, filed on Sep. 12, 2025, now Pat. No. 12,608,555, said application No. 19/328,103 is a continuation-in-part of application No. 19/326,730, filed on Sep. 12, 2025, now Pat. No. 12,608,555, said application No. 19/351,286 is a continuation-in-part of application No. 19/321,173, filed on Sep. 6, 2025, now Pat. No. 12,602,549, said application No. 19/326,730 is a continuation-in-part of application No. 19/321,173, filed on Sep. 6, 2025, now Pat. No. 12,602,549, which is a continuation-in-part of application No. 19/284,115, filed on Jul. 29, 2025, said application No. 19/326,730 is a continuation-in-part of application No. 19/245,366, filed on Jun. 22, 2025, now Pat. No. 12,418,680, and a continuation-in-part of application No. 19/203,069, filed on Jun. 3, 2025, now Pat. No. 12,481,688, which is a continuation-in-part of application No. 19/205,960, filed on May 12, 2025, said application No. 19/326,730 is a continuation-in-part of application No. 19/204,525, filed on May 10, 2025, which is a continuation-in-part of application No. 19/192,215, filed on Apr. 28, 2025, said application No. 19/205,960 is a continuation-in-part of application No. 19/060,794, filed on Feb. 24, 2025, said application No. 19/284,115 is a continuation of application No. 19/051,193, filed on Feb. 12, 2025, now Pat. No. 12,387,050, said application No. 19/060,794 is a continuation-in-part of application No. 19/044,546, filed on Feb. 3, 2025, which is a continuation-in-part of application No. 19/026,276, filed on Jan. 16, 2025, said application No. 19/192,215 is a continuation-in-part of application No. 18/972,797, filed on Dec. 6, 2024, now Pat. No. 12,294,392, said application No. 19/026,276 is a continuation-in-part of application No. 18/928,022, filed on Oct. 26, 2024, said application No. 18/919,417 is a continuation-in-part of application No. 18/918,077, filed on Oct. 17, 2024, said application No. 18/928,022 is a continuation-in-part of application No. 18/919,417, filed on Oct. 17, 2024, now Pat. No. 12,602,586, said application No. 18/918,077 is a continuation-in-part of application No. 18/737,906, filed on Jun. 7, 2024, and a continuation-in-part of application No. 18/736,498, filed on Jun. 6, 2024, said application No. 18/972,797 is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(60) Provisional application No. 63/887,491, filed on Sep. 24, 2025, provisional application No. 63/847,889, filed on Jul. 21, 2025, provisional application No. 63/847,091, filed on Jul. 19, 2025, provisional application No. 63/847,101, filed on Jul. 19, 2025, provisional application No. 63/847,082, filed on Jul. 19, 2025, provisional application No. 63/847,096, filed on Jul. 19, 2025, provisional application No. 63/651,359, filed on May 23, 2024.

(58) Field of Classification Search
USPC ......................................................... 375/240
See application file for complete search history.

(56) References Cited

U.S. PATENT DOCUMENTS

| | | | |
|---|---|---|---|
| 7,876,257 | B2 | 1/2011 | Vetro et al. |
| 11,234,006 | B2 | 1/2022 | Wang et al. |
| 11,656,353 | B2 | 5/2023 | Li et al. |
| 11,729,406 | B2 | 8/2023 | Habibian et al. |
| 11,915,690 | B1 | 2/2024 | Chang et al. |
| 12,223,456 | B1 | 2/2025 | Manohar et al. |
| 12,375,766 | B2 * | 7/2025 | Barbieri ................. G06T 11/00 |
| 2002/0091801 | A1 | 7/2002 | Lewin et al. |
| 2004/0083195 | A1 | 4/2004 | McCord et al. |
| 2009/0235099 | A1 | 9/2009 | Branover et al. |
| 2019/0174514 | A1 | 6/2019 | Ramesh et al. |
| 2020/0272605 | A1 | 8/2020 | More |
| 2020/0336562 | A1 | 10/2020 | Luft |
| 2020/0351344 | A1 | 11/2020 | Das Gupta et al. |
| 2020/0404340 | A1 | 12/2020 | Xu et al. |
| 2021/0073808 | A1 | 3/2021 | Gu et al. |
| 2021/0406224 | A1 | 12/2021 | Neufeld et al. |
| 2022/0138156 | A1 | 5/2022 | Wang et al. |
| 2022/0246158 | A1 | 8/2022 | Nam et al. |
| 2023/0316006 | A1 | 10/2023 | Tunstall-Pedoe et al. |
| 2024/0104391 | A1 | 3/2024 | Higgins et al. |
| 2024/0160955 | A1 | 5/2024 | Zhao et al. |
| 2024/0289395 | A1 | 8/2024 | Zhou et al. |
| 2024/0354320 | A1 | 10/2024 | Procter et al. |
| 2024/0386015 | A1 | 11/2024 | Crabtree et al. |
| 2024/0411809 | A1 | 12/2024 | Najafirad et al. |
| 2024/0428008 | A1 | 12/2024 | Abraham et al. |
| 2025/0028882 | A1 | 1/2025 | Ataei et al. |
| 2025/0085894 | A1 | 3/2025 | Lee et al. |
| 2025/0094455 | A1 | 3/2025 | Bista et al. |
| 2025/0278634 | A1 | 9/2025 | Kumar et al. |
| 2026/0136078 | A1 * | 5/2026 | Gao ........................ G06T 19/20 |

OTHER PUBLICATIONS

Cai, Yuanhao et al; "Mask-guided Spectral-wise Transformer for Efficient Hyperspectral Image Reconstruction", Conference on Computer Vision and Pattern Recognition, pp. 17502-17511, 2022.

Cai, Yuanhao et al; "MST++: Multi-stage Spectral-wise Transformer for Efficient Spectral Reconstruction", Conference on Computer Vision and Pattern Recognition, 2022.

Gao, Hang & Zhang, Yongfeng; "Memory Sharing for Large Language Model Based Agents", arXiv:2404.09982v2, Jul. 5, 2024.

Gim, In, et al; "Prompt Cache: Modular Attention Reuse for Low-Latency Inference", arXiv:2311.04934v2, Apr. 2024.

He, Kaiming et al; "Deep Residual Learning for Image Recognition", Conference on Computer Vision and Pattern Recognition, pp. 770-778, 2016.

Ramirez, Guillem, et al; "Cache & Distil: Optimising API Calls to Large Language Models", arXiv:2310.13561v1, Oct. 20 2023.

(56)          References Cited

OTHER PUBLICATIONS

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

Generative Video from
Multimodal Latent Sensor
Data System Architecture
100

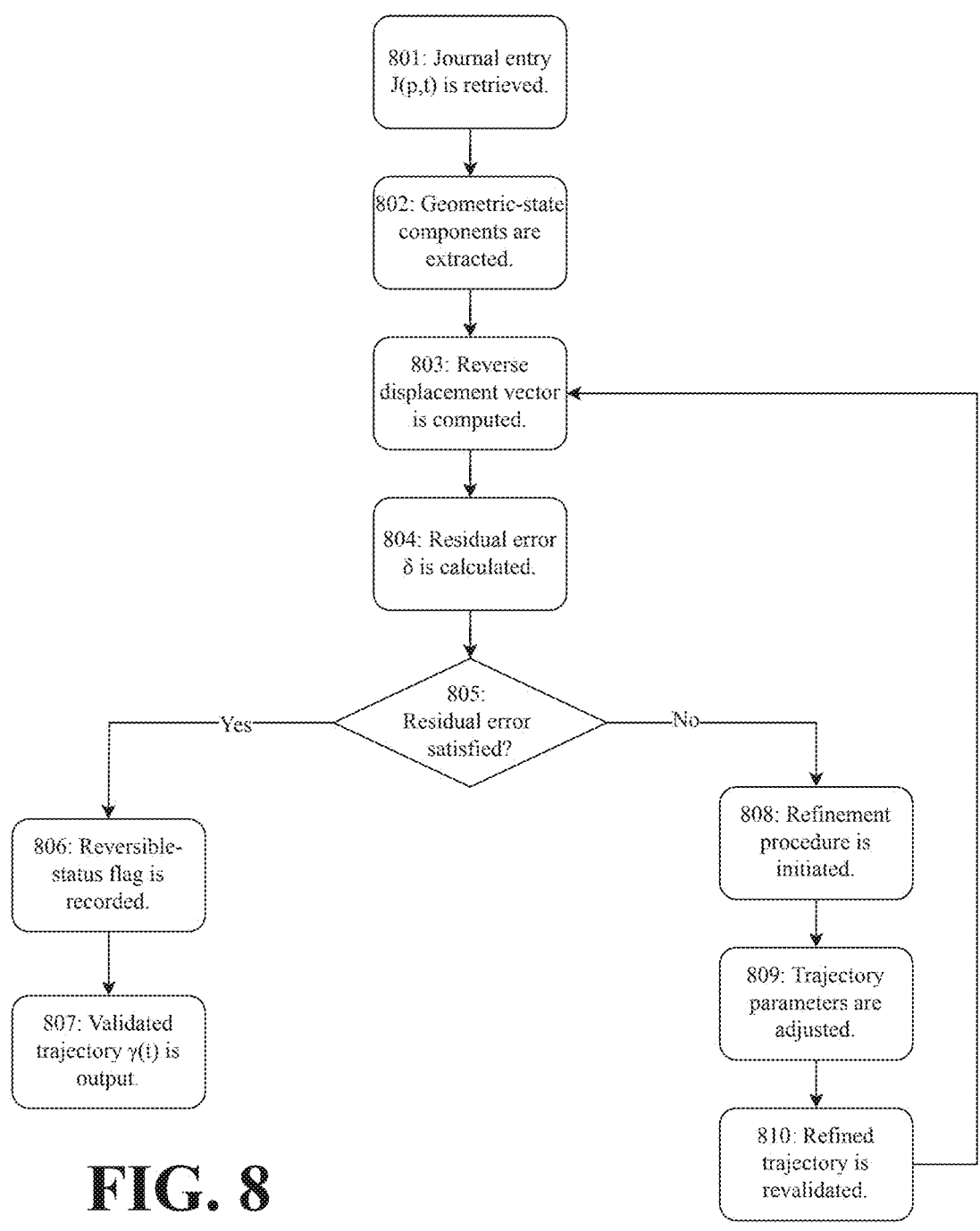

801: Journal entry J(p,t) is retrieved.

802: Geometric-state components are extracted.

803: Reverse displacement vector is computed.

804: Residual error δ is calculated.

805: Residual error satisfied?

Yes

No

806: Reversible-status flag is recorded.

807: Validated trajectory γ(t) is output.

808: Refinement procedure is initiated.

809: Trajectory parameters are adjusted.

810: Refined trajectory is revalidated.

FIG. 8

SYSTEMS AND METHODS FOR GENERATIVE VIDEO RECONSTRUCTION USING MULTIMODAL LATENT SENSOR DATA

CROSS-REFERENCE TO RELATED APPLICATIONS

Priority is claimed in the application data sheet to the following patents or patent applications, each of which is expressly incorporated herein by reference in its entirety:

Ser. No. 19/380,869
Ser. No. 19/369,319
Ser. No. 19/363,675
Ser. No. 19/351,286
Ser. No. 19/321,173
Ser. No. 19/284,115
Ser. No. 19/051,193
63/847,082
63/847,091
63/847,096
63/847,101
Ser. No. 19/328,179
Ser. No. 19/326,730
63/847,889
Ser. No. 19/245,366
Ser. No. 19/204,525
Ser. No. 19/192,215
Ser. No. 18/972,797
Ser. No. 18/648,340
Ser. No. 18/427,716
Ser. No. 18/410,980
Ser. No. 18/537,728
63/887,491
Ser. No. 19/329,369
Ser. No. 19/328,199
Ser. No. 19/328,103
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359

BACKGROUND OF THE INVENTION

Field of the Art

The present invention relates to the field of cognitive computing and multimodal data processing, and more specifically to systems and methods for generating synthetic video from heterogeneous sensor inputs through latent manifold traversal within a persistent cognitive substrate.

Discussion of the State of the Art

Conventional approaches to multimodal data processing and visualization have generally focused on sensor fusion pipelines that align and display heterogeneous data streams in a common coordinate framework without deep integration of their internal structures. Existing systems may combine video, acoustic, and thermal inputs through feature concat-enation or temporal synchronization, producing composite imagery or dashboards that represent correlated measurements. In these frameworks, each sensor modality typically retains its own processing chain and contributes independently to the visualization, limiting the extent to which relationships among modalities can be learned or represented geometrically. While such multimodal systems have improved situational awareness and monitoring capability, they often lack the capacity to generate new or predictive visual content from incomplete or non-visual inputs.

More recent research in generative artificial intelligence has explored the use of machine learning models to synthesize video or imagery from textual prompts, static images, or partially observed sensor data. These systems may rely on diffusion networks or deep generative adversarial models that learn mappings between descriptive embeddings and visual outputs. Although capable of creating plausible video sequences, such generative systems typically operate as black-box transformations that do not preserve the internal geometry of the underlying data, nor do they maintain audit trails that link generated frames to source inputs. As a result, conventional generative video systems cannot be verified, reversed, or integrated into long-term cognitive architectures. Their outputs lack traceability to physical measurements and provide no mechanism for round-trip validation or replay.

In industrial and defense contexts, sensor fusion platforms may display time-synchronized overlays of radar, sonar, or thermal imagery to assist operators, yet these systems are generally limited to visualizing data already captured. They do not project synthetic video representing inferred or predicted events from non-visual sensors, nor do they support reversible transformations between sensor space and visual space. Furthermore, existing multimodal analytic systems rarely incorporate persistent cognitive mechanisms capable of storing latent states, evolving landmarks, or performing off-task consolidation. As a result, they are unable to perform generative reasoning that spans sessions or adaptively reconfigure their internal geometry based on accumulated experience.

Accordingly, there remains a gap between conventional multimodal visualization and the kind of structured, reversible, and cognitively persistent generation required for auditable synthetic video derived from heterogeneous sensors. Existing systems may either fuse data without geometric integration or generate video without traceable correspondence to the originating data sources. What is needed is a computational architecture that unifies multimodal sensor embeddings within a persistent latent manifold, traverses that manifold through mathematically defined geodesic operations, and projects those traversals into synthetic video that remains auditable, reversible, and continuously integrated within a cognitive substrate.

SUMMARY OF THE INVENTION

Accordingly, the inventor has conceived and reduced to practice systems and methods for generating synthetic video from heterogeneous multimodal sensor data within a persistent cognitive substrate. In various embodiments, a computer system maintains a structured latent manifold that unifies diverse sensor inputs into a single geometric representation and projects traversals of that manifold into visual form. The invention enables a cognitive computing framework in which acoustic, thermal, textual, and other sensor streams are fused into a reversible geometric space and traversed through mathematically defined operators to produce auditable, synthetic video consistent with multimodal evidence.

In an embodiment, a computer system is configured to maintain a persistent cognitive substrate comprising a latent manifold that supports multimodal geometric representations. The system may receive heterogeneous sensor data from multiple modalities and encode each modality into a corresponding embedding subspace of the manifold, producing latent vectors that preserve modality-specific structure. The encoded data may then be projected into a unified multimodal latent space through cross-modal projection operators that map between modality subspaces, creating a coherent manifold in which related information from disparate sensors becomes geometrically aligned. Within this manifold, the system may establish multimodal landmarks that act as convergence points where signals from different modalities meet and reinforce one another. The system may compute geodesic trajectories through the latent space guided by these landmarks, using stored geometric information to maintain reversibility. Synthetic video output may then be generated by projecting the computed trajectories into a visual domain, the resulting video being derived directly from the multimodal sensor inputs rather than reconstruction of existing footage. The system may further validate the reversibility of the generated video by computing round-trip residuals between forward and reverse traversals and may persist both landmarks and trajectories across operational sessions within a thought cache that maintains the persistent cognitive substrate.

In an aspect of an embodiment, the cross-modal projection operators may include an acoustic-to-visual operator that maps acoustic sensor data into visual coordinates, a thermal-to-visual operator that maps temperature data into visual overlays, and a text-to-anchor operator that associates textual metadata with semantic anchors in the visual manifold.

In an aspect of an embodiment, each multimodal landmark may be defined by minimizing a weighted energy functional that determines a geometric center based on representative latent points from each modality, with weights that describe the relative salience of each modality and distances measured according to the geodesic metric of the manifold.

In an aspect of an embodiment, the system may maintain a manifold journal that records geometric state information at each traversal step, including metric tensors, connection coefficients, tangent displacements, and semantic anchors, and may enable cryptographic verification of navigation paths through hash-linked entries.

In an aspect of an embodiment, the system may execute consolidation processes during off-task operation that strengthen frequently co-activated landmarks, prune those with low recurrence, and merge nearby landmarks into higher-order schemas; during these same processes, the system may generate counterfactual video scenarios by perturbing recorded trajectories while preserving approximate reversibility.

In an aspect of an embodiment, the generation of synthetic video may employ a Lorentzian autoencoder operating under a pseudo-Riemannian metric to preserve temporal causality, traverse multiple axes including spatial, temporal, spectral, and semantic dimensions, and apply correlation networks to maintain spatiotemporal consistency across frames.

In an aspect of an embodiment, the heterogeneous sensor inputs may include, without limitation, distributed acoustic sensing fiber-optic data, electric submersible pump telemetry, sonar or radar returns, thermal imagery, internet-of-things data streams, and geospatially tagged textual annotations.

In an aspect of an embodiment, multiple systems may operate in federation, with multimodal landmarks exchanged through fiber-transport maps, validated through round-trip audits of residual error, and synchronized to enable shared situational awareness across distributed nodes.

In an aspect of an embodiment, the verification of reversibility may include computing reverse displacement vectors using logarithmic maps derived from the journaled geometric state, measuring the difference between forward and reverse paths, and initiating refinement when the deviation exceeds a defined threshold.

The invention may also be practiced as a computer-implemented method that performs substantially the same operations described above for the computer system, including encoding heterogeneous modalities, establishing and traversing multimodal landmarks within a latent manifold, projecting traversals into visual form, validating reversibility, and persisting the resulting structures within a persistent cognitive substrate.

BRIEF DESCRIPTION OF THE DRAWING FIGURES

FIG. 8 illustrates reversibility validation operations of a generative video system, showing retrieval of geometric state, computation of residual error, and refinement of geodesic trajectories.

US 12,699,848 B2

5 ing of sonar, thermal, and textual data, multimodal fusion, geodesic traversal, and synthesis of enhanced synthetic video output.

Figure 11:
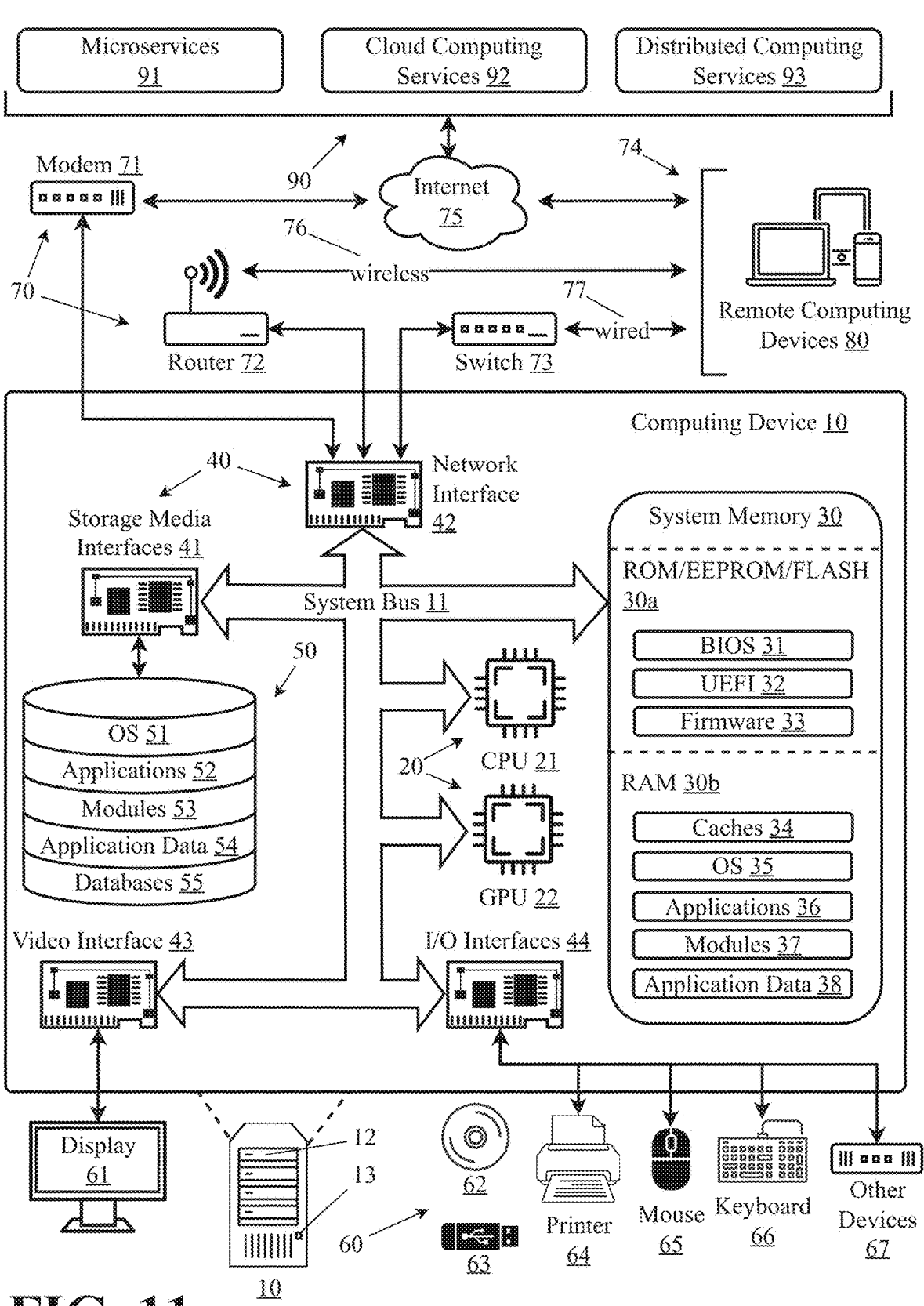

FIG. 11 illustrates an exemplary computing environment on which an embodiment described herein may be implemented.

DETAILED DESCRIPTION OF THE INVENTION

The inventor has conceived and reduced to practice systems and methods for generating synthetic video projections from multimodal latent sensor data within a persistent cognitive computing architecture. In various embodiments, the system may receive heterogeneous inputs such as acoustic, thermal, sonar, distributed acoustic sensing, geospatial, and textual data, which are encoded into structured latent subspaces and fused into a shared multimodal manifold. The fused representation supports reversible traversal across the manifold, enabling a generative projection subsystem to synthesize coherent video sequences that reflect consistent relationships among the contributing modalities. The architecture operates as a persistent computational substrate maintaining a cache of latent states that may be consolidated or pruned across operational cycles to improve continuity and stability of generated outputs.

In operation, multimodal sensor data may first be encoded into latent subspaces, each defined for a corresponding modality. The collective manifold may be expressed as $$M = M\_visual \times M\_acoustic \times M\_thermal \times M\_text \times \ldots,$$

where each M_i represents the embedding domain for a particular modality. Encoded feature points x_i within each M_i may then be mapped into a common latent space through a fusion operator $P:S\_i \rightarrow M$, where S_i denotes the source domain for modality i. The fused latent position z* representing a multimodal convergence point may be calculated by minimizing an energy functional, for example:

$$z* = \mathrm{argmin}(z \in M)\sum_i \left[ w_i \cdot d_i(z, x_i)^2 + \eta \cdot P(z) \right]$$

where $w_i$ corresponds to a salience weighting factor, $d_i(z, x_i)$ represents a geodesic distance computed within submanifold $M_i$, P(z) is a curvature-derived potential such as compression pressure, and $\eta$ is a scalar coefficient that modulates curvature influence. This operation identifies a point in the multimodal manifold that lies at a minimal overall displacement from its constituent modality embeddings while incorporating local geometric information.

Each fused position may correspond to a multimodal landmark that remains stable under curvature and recurrence properties. A compression pressure field P(z) derived from the Ricci curvature of the manifold may be calculated as $$P(z) = -Ric(z),$$

where Ric(z) denotes the Ricci curvature tensor at position z. A stable landmark may satisfy

6

$$\nabla P(z^*) \approx 0 \text{ and } Hess(P)(z^*) > 0,$$

indicating that z* lies near a region of relative geometric stability. In some implementations, landmark formation may also be defined by minimizing a combined energy functional of the form $$\Lambda = \mathrm{argmin}(z \in M)[\alpha \cdot |A(z)| + \beta \cdot P(z) - \gamma \cdot R(z)],$$

where A(z) denotes local action density, P(z) represents compression pressure, R(z) represents recurrence frequency, and $\alpha$, $\beta$, $\gamma$ are weighting coefficients. The resulting landmark may represent a geometric attractor correlating features across modalities while maintaining consistency with manifold curvature and traversal dynamics.

Traversal through the latent manifold may be performed by a geodesic traversal engine configured to compute reversible mappings between latent points. A traversal path $\gamma(t)$ may be defined under a pseudo-Riemannian metric g, where exponential and logarithm maps relate positions and tangent vectors. For points p and q in M, these mappings may be expressed as $$q = \exp\_p(v) \text{ and } v = \log\_p(q),$$

where v represents a tangent displacement at p. A measure of reversibility may be expressed as a residual error $$\varepsilon = \|\log\_p(q) - v\|\_g,$$

evaluated with respect to the local metric g. Traversal between distant points may occur through intermediate landmarks, such that a path may be decomposed as $$p \rightarrow \Lambda_1 \rightarrow \Lambda_2 \rightarrow \ldots \rightarrow q,$$

supporting traversal stability and providing natural checkpoints for replay or audit operations within the manifold.

Generative video projection may be performed by mapping the traversed latent trajectory into a visual manifold. In one embodiment, a Lorentzian autoencoder may be used to project points along $\gamma(t)$ into a video reconstruction space while preserving spatial, temporal, and semantic coherence. Correlation networks operating along multiple axes of the manifold may regulate attention and continuity across frames. The projection subsystem may output a sequence of visual frames derived from latent trajectories, producing video that reflects multimodal relationships among the input data. Each frame may correspond to a recorded point in a journaling structure, allowing the sequence to be retraced or replayed from its latent origin.

Data generated through projection may remain integrated within the persistent cognitive cache, such that the manifold itself evolves with operational experience. During rest or off-task cycles, stored trajectories and landmarks may undergo consolidation, pruning, or generalization. Consolidation may reinforce landmarks that are frequently reactivated by adjusting salience coefficients according to a recurrence relationship such as $$dw_i/dt \propto R(z_i),$$

where $R(z_i)$ represents an activation or recurrence rate associated with a landmark. Pruning may gradually reduce weights for rarely encountered structures, and generalization may merge proximate landmarks into higher-order schemas to provide efficient cognitive scaffolding. These adaptive updates maintain structural continuity and support efficient reuse of multimodal relationships during subsequent projections.

In distributed implementations, multiple computational nodes may exchange landmark structures through reversible fiber mappings. A landmark represented by a tuple $\{(x_i, w_i)\}$ at one node may be transmitted to another, where an equivalent latent position z_B* is reconstructed within the recipient manifold. A round-trip residual may be evaluated as $$\delta = \|z\_A * - \Phi\_(A \rightarrow B)(z\_B *)\|\_g,$$

where $\Phi\_(A \rightarrow B)$ denotes the mapping from the source to the target manifold. Low residual values indicate substantial alignment between the manifolds of participating nodes. This federated architecture supports collaborative processing of multimodal data while maintaining coherent generative outputs across independent computing environments.

Practical examples of operation may include the generation of synthetic surveillance video from sparse radar and sonar data, diagnostic visualization of industrial equipment conditions using distributed acoustic and thermal inputs, or scientific rendering of astrophysical events derived from multimodal sensor measurements. In each instance, heterogeneous inputs may be mapped into latent subspaces, fused into a shared manifold, traversed along geodesic paths, and projected into a visual output domain. The resulting system supports reversible and auditable generation of video content that reflects multimodal evidence through mathematically defined latent operations and curvature-aware fusion dynamics.

In some embodiments, the system may be realized as a computer architecture composed of interacting subsystems configured to transform multimodal sensor data into geometrically auditable synthetic video output within a persistent cognitive substrate. Heterogeneous sensor inputs are first acquired by a multimodal input aggregator configured to synchronize and tag data streams from diverse sources such as acoustic, thermal, distributed acoustic sensing, radar, lidar, textual annotations, and geospatial telemetry. Each incoming signal may be normalized to a common temporal reference and enriched with contextual metadata identifying its modality and origin. The aggregated, timestamped data packets are then routed to modality-specific encoders that transform each sensor stream into a latent embedding within an associated subspace of the overall manifold. These encoders may preserve modality-specific structures—for instance, temporal coherence in acoustic signals or spatial gradients in thermal imagery—so that each embedding subspace M_i retains its internal geometric integrity while remaining compatible with cross-modal projection.

Encoded embeddings are then projected into a unified multimodal latent space through a latent fusion engine configured to compute cross-modal projection operators between modality subspaces. These operators, such as acoustic-to-visual, thermal-to-visual, or text-to-anchor projections, may map heterogeneous feature spaces into a shared manifold where distances correspond to geometric or semantic similarity. Within this fused manifold, the system may establish multimodal landmarks as convergence points by minimizing a weighted energy functional that accounts for geodesic distances among representative latent points and modality-specific salience weights. Each landmark thus represents a geometric center of correlated multimodal evidence and may serve as an attractor or waypoint for subsequent traversal. The fused latent state and its landmarks are serialized within a persistent cognitive substrate that functions as a long-term vector cache, maintaining continuity of cognitive geometry across sessions and supporting retrieval and replay of prior trajectories.

From these stored latent states, a geodesic traversal engine computes navigation paths through the multimodal manifold. Traversal paths may be obtained by integrating the geodesic equation using local metric tensors and connection coefficients while applying curvature-dependent constraints such as compression pressure or potential fields that correspond to goal specifications. Navigation may proceed along multiple axes—including spatial, temporal, spectral, and semantic dimensions—and may be guided by landmarks that decompose long trajectories into locally stable segments. Each step of traversal may be recorded within a manifold journal that stores geometric parameters, tangent vectors, and semantic anchors, enabling reversible replay. The journal entries may be hashed or otherwise cryptographically linked to maintain verifiable continuity of the traversal record.

Reversibility of navigation is maintained through a verification process that computes reverse displacement vectors using logarithmic maps derived from the journaled geometric state. A residual difference between forward and reverse vectors provides a quantitative measure of reversible fidelity. If the residual exceeds a defined tolerance, the system may refine the trajectory through local re-integration or corrective adjustment within the manifold. This verification process allows the system to quantify the accuracy of its geometric transformations and to maintain trust in the auditability of the synthetic outputs.

The validated trajectory is then projected into visual form by a generative video projection subsystem employing a Lorentzian autoencoder configured to preserve temporal causality through a pseudo-Riemannian metric. The subsystem decodes points along the trajectory into corresponding visual frames, where each frame reflects the spatial, spectral, and semantic components of the underlying multimodal state. Correlation networks operating across frame sequences may enhance texture, continuity, and cross-modal coherence, such that visual cues correspond with the underlying acoustic or thermal events encoded in the latent manifold. The generated frames collectively form a synthetic video sequence that is not reconstructed from existing footage but generated as a direct visualization of multimodal sensor reasoning within the manifold.

Generated video data and associated geometric states are retained within the persistent cognitive substrate to support iterative improvement. During idle or off-task operation, a sleep or consolidation engine may analyze recorded trajectories, reinforce frequently co-activated landmarks, prune infrequent or high-error landmarks, and merge related ones into generalized schemas. Perturbations of prior trajectories may also be used to produce counterfactual video sequences that explore nearby regions of the manifold while maintaining approximate reversibility. These operations adapt the manifold's internal geometry over time, improving efficiency and contextual fidelity for future projections.

The human interface and audit layer provides comprehensive operator interaction capabilities through multiple interface modalities configured to present both the generated synthetic video outputs and the underlying geometric reasoning that produced them. The interface subsystem may comprise a multi-panel display architecture wherein a primary viewport renders the generated video stream with overlaid confidence metrics, while secondary panels present provenance visualizations including latent trajectory paths, multimodal landmark positions, and temporal evolution of the manifold traversal. Interactive controls enable operators to manipulate a temporal slider for rewinding and replaying the generation process, with each slider position corresponding to a specific point along the geodesic trajectory in the latent manifold. The audit interface may further provide a three-dimensional visualization of the unified multimodal manifold, rendering landmarks as geometric nodes with edges representing traversal paths, colored or weighted according to their residual error metrics and recurrence frequencies. Modality filtering controls allow selective display of contributions from specific sensor inputs, enabling operators to isolate and examine how individual modalities influence the generated video output. The audit trail display presents cryptographically verified journal entries in a hierarchical tree structure, where each node can be expanded to reveal the complete geometric state including metric tensors, Christoffel symbols, and tangent displacements at that traversal point, with hash values displayed for third-party verification.

The persistent cognitive substrate may be implemented using a combination of vector databases optimized for high-dimensional similarity search and graph databases for maintaining landmark relationships and traversal histories. The vector storage component may employ approximate nearest neighbor indexing structures such as hierarchical navigable small world graphs or locality-sensitive hashing to enable efficient retrieval of thought vectors from collections potentially containing millions of cached states. The landmark registry within the substrate may utilize a spatial index such as an R-tree or KD-tree adapted for the dimensionality of the latent manifold, enabling rapid identification of nearby landmarks during traversal operations. The system may maintain separate storage tiers for active thoughts currently involved in traversal operations, dormant thoughts eligible for consolidation, and archived thoughts preserved for long-term audit requirements. Memory management policies may dynamically promote thoughts between tiers based on access patterns and recurrence metrics. For federation coordination, the system may implement a gossip protocol for landmark exchange, wherein nodes periodically broadcast digest summaries of their landmark registries using bloom filters to identify divergent entries requiring synchronization. The fiber transport protocol may employ a combination of TCP for reliable landmark transmission and UDP for lightweight heartbeat and divergence monitoring, with all communications encrypted using elliptic curve cryptography and authenticated through a distributed ledger maintaining node identities and trust relationships.

In federated deployments, multiple instances of the system may exchange landmarks and trajectories across a network of persistent cognitive machines. Fiber transport maps may translate coordinates and geometric structures from one manifold to another, allowing distributed systems to share reference landmarks and align their internal geometry. Round-trip audits computed between transmitted and received structures quantify divergence and support synchronization of shared cognitive context. Through this federated exchange, multiple systems may generate consistent synthetic video outputs representing a shared situational environment while each maintains local auditability and persistence.

In further embodiments, the disclosed architecture may be implemented across diverse operational domains, where heterogeneous sensor data can be transformed into synthetic video that conveys complex multimodal information in visually interpretable form. The following examples illustrate representative use cases demonstrating the practical operation of the system and its constituent subsystems. These examples are not limiting, and other configurations may be derived according to the same underlying principles of multimodal encoding, latent manifold traversal, and generative projection.

In a defense-oriented embodiment, the system may receive input from sparse or partially degraded radar and sonar signals, textual mission reports, and distributed acoustic sensors deployed in a marine environment. The multimodal input aggregator may align the asynchronous sensor streams by timestamp and modality tags, while the multimodal encoder suite produces modality-specific latent embeddings that preserve temporal and spectral structure. The latent fusion engine may then project these embeddings into a shared manifold through acoustic-to-visual and text-to-anchor operators. Within this manifold, the system may identify multimodal landmarks corresponding to regions of correlated acoustic returns and textual annotations referencing potential underwater activity. The geodesic traversal engine may navigate between these landmarks to form a trajectory describing the evolving event. A Lorentzian autoencoder may decode this trajectory into a synthetic video feed showing a coherent visual depiction of submersible motion consistent with the available sonar and text data. The manifold journal and reversibility verification engine may preserve the geometric record of this process, allowing auditors to replay and confirm that the generated video aligns with the underlying sensor evidence.

In an industrial embodiment, the system may process distributed acoustic sensing signals, vibration telemetry, and temperature readings from subsurface equipment such as electric submersible pumps. The multimodal encoder suite may convert each data type into latent embeddings within their respective subspaces, and the fusion engine may construct landmarks representing co-occurrences of abnormal vibration and thermal signatures. The traversal engine may compute a geodesic trajectory that connects these landmarks, guided by curvature and recurrence fields in the latent manifold. The generative video projection subsystem may transform this trajectory into a diagnostic video sequence illustrating mechanical behavior within the pump assembly. Visual motion and coloration in the generated video may correspond to latent variables derived from pressure, vibration, and temperature data, providing a clear, machine-derived visualization of system performance. The correlation network may further enhance frame-to-frame continuity and restore fine-scale visual detail, producing a high-fidelity synthetic feed for operational analysis.

In a scientific embodiment, the system may integrate signals from gravitational wave detectors, radio interferometers, and annotation data describing theoretical event parameters. The encoders may produce embeddings that capture spectral, temporal, and textual components of these signals, which are then fused into a multimodal manifold through projection operators that align physical sensor dimensions with conceptual descriptors. The system may generate landmarks that represent recurrent alignments between waveform peaks, spatial correlations, and annotated astrophysical interpretations. Traversal through this manifold may produce a trajectory that captures the evolution of the event as a continuous geodesic path, which the generative video subsystem may project into a synthetic visualization showing space-time distortions as animated curvature fields. The resulting video may be auditable through its journaled geometric parameters, permitting scientific verification and replay under modified conditions.

Across these and other implementations, the architecture maintains a persistent cognitive substrate that records fused latent states, trajectories, and generated outputs within a unified framework. During idle operation, the sleep or consolidation engine may review stored data to reinforce salient landmarks and merge recurrent geometric structures into higher-order schemas. Counterfactual generation may also occur during these periods, whereby the system explores perturbed trajectories to synthesize alternative but geometrically consistent video representations. In multi-system deployments, federated cognitive machines may exchange landmark tuples and manifold updates, maintaining approximate alignment of geometric context while supporting shared visualization outputs.

These example embodiments demonstrate that the disclosed system is not limited to reconstructing existing visual data but instead produces synthetic video representations derived from multimodal sensor inputs through mathematically defined, auditable latent operations. By unifying encoding, traversal, projection, and persistence within a cognitive substrate, the architecture provides a scalable and reversible framework for converting heterogeneous sensor information into interpretable visual form.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "persistent cognitive substrate" refers to a computer-implemented data structure that maintains vectorized latent states, multimodal landmarks, and semantic bindings across operational sessions, enabling continuity and auditability of cognitive geometry.

As used herein, "thought cache" refers to a persistent storage portion of the cognitive substrate that serializes and retrieves latent state vectors, geodesic trajectories, and landmark tuples, supporting long-term reuse and consolidation.

As used herein, "latent manifold" refers to a structured, high-dimensional geometric space represented in computer memory, in which multimodal sensor embeddings are aligned and traversed using mathematically defined metrics and connection coefficients.

As used herein, "multimodal subspace" refers to an embedding domain corresponding to a specific sensor modality, such as acoustic, thermal, textual, or geospatial data, each preserving its intrinsic geometric relationships.

As used herein, "cross-modal projection operator" refers to a machine-implemented mapping function $(R\_{ij}:M\_i \to M\_j)$ that transforms feature vectors from one modality's latent subspace into another, preserving geometric and semantic relationships.

As used herein, "multimodal landmark" refers to a persistent geometric convergence point within the latent manifold that represents correlated features from multiple sensor modalities, computed through weighted geodesic minimization and stabilized by curvature conditions.

As used herein, "geodesic trajectory" refers to a computed path through the latent manifold obtained by integrating the geodesic equation under the local metric tensor, representing a minimal or constrained traversal between latent points.

As used herein, "reversibility" refers to a quantifiable property of a computed trajectory indicating that forward and reverse mappings between latent points are consistent within a defined residual-error tolerance.

As used herein, "round-trip residual error" refers to the difference, measured under the local manifold metric, between the original forward displacement vector and the computed reverse displacement vector along a geodesic path.

As used herein, "Lorentzian autoencoder" refers to a neural network model trained under a pseudo-Riemannian metric that preserves temporal causality while decoding latent trajectories into temporally consistent visual frames.

As used herein, "compression-pressure field" refers to a scalar field derived from the manifold's Ricci curvature that governs convergence stability and influences landmark formation through curvature-dependent potential gradients.

As used herein, "semantic anchor" refers to a symbolic or textual label associated with a specific latent coordinate or landmark, providing semantic context within the multimodal manifold.

As used herein, "multimodal input aggregator" refers to a hardware- or software-implemented subsystem configured to receive heterogeneous sensor streams, align their temporal sampling, and tag each with modality identifiers and contextual metadata.

As used herein, "multimodal encoder suite" refers to a collection of modality-specific neural encoders that transform raw sensor data into latent feature embeddings while preserving modality-specific geometric structure.

As used herein, "latent fusion engine" refers to a subsystem configured to project encoded modality embeddings into a unified multimodal latent space using cross-modal operators and weighted energy minimization to establish geometric convergence landmarks.

As used herein, "geodesic traversal engine" refers to a computational subsystem that integrates the geodesic equation using stored metric tensors and connection coefficients to compute reversible navigation paths through the latent manifold.

As used herein, "manifold journal" refers to a structured log stored in non-transitory memory containing per-step geometric-state information, including metric tensors, connection coefficients, tangent vectors, and cryptographic hashes linking sequential entries.

As used herein, "reversibility verification engine" refers to a subsystem configured to compute reverse displacement vectors via logarithmic maps, evaluate residual error, and certify geodesic trajectory reversibility within defined tolerances.

As used herein, "generative video projection subsystem" refers to a decoding component employing a Lorentzian autoencoder to transform latent trajectories into synthetic video frames consistent with multimodal evidence.

As used herein, "correlation network" refers to a neural enhancement component that performs spatial, temporal, and cross-modal correlation analysis to restore details attenuated during latent compression and ensure frame-to-frame coherence.

As used herein, "sleep and dream consolidation engine" refers to an autonomous background subsystem that reorganizes manifold geometry by strengthening, pruning, and merging landmarks, generating counterfactual trajectories, and adapting metric tensors during off-task operation.

As used herein, "federation coordination engine" refers to a distributed synchronization subsystem that exchanges multimodal landmarks and trajectories among persistent cognitive machines through fiber-transport maps and verifies geometric consistency by round-trip audit.

As used herein, "human interface and audit layer" refers to a software interface enabling visualization, replay, and verification of generated video outputs together with cryptographically verifiable provenance records.

As used herein, "fiber-transport map" refers to a differentiable transformation that translates coordinate structures and landmarks between manifolds maintained by separate but federated systems while preserving local geometric relationships.

As used herein, "counterfactual trajectory" refers to a perturbed geodesic path generated during sleep or consolidation processes that explores alternative but geometrically consistent scenarios within the latent manifold.

As used herein, "schema" refers to a higher-order cognitive structure formed by merging recurrent or proximate landmarks into generalized manifold patterns representing stable conceptual relationships.

As used herein, "engine" or "subsystem" refers to a specialized set of machine-executable instructions or hardware logic configured to perform specific computational operations on stored data structures, and not a generic module or mental process.

As used herein, "computer system" refers to one or more interconnected computing devices including processors, memory, and data storage configured to execute software instructions implementing the described operations.

Figure 1:
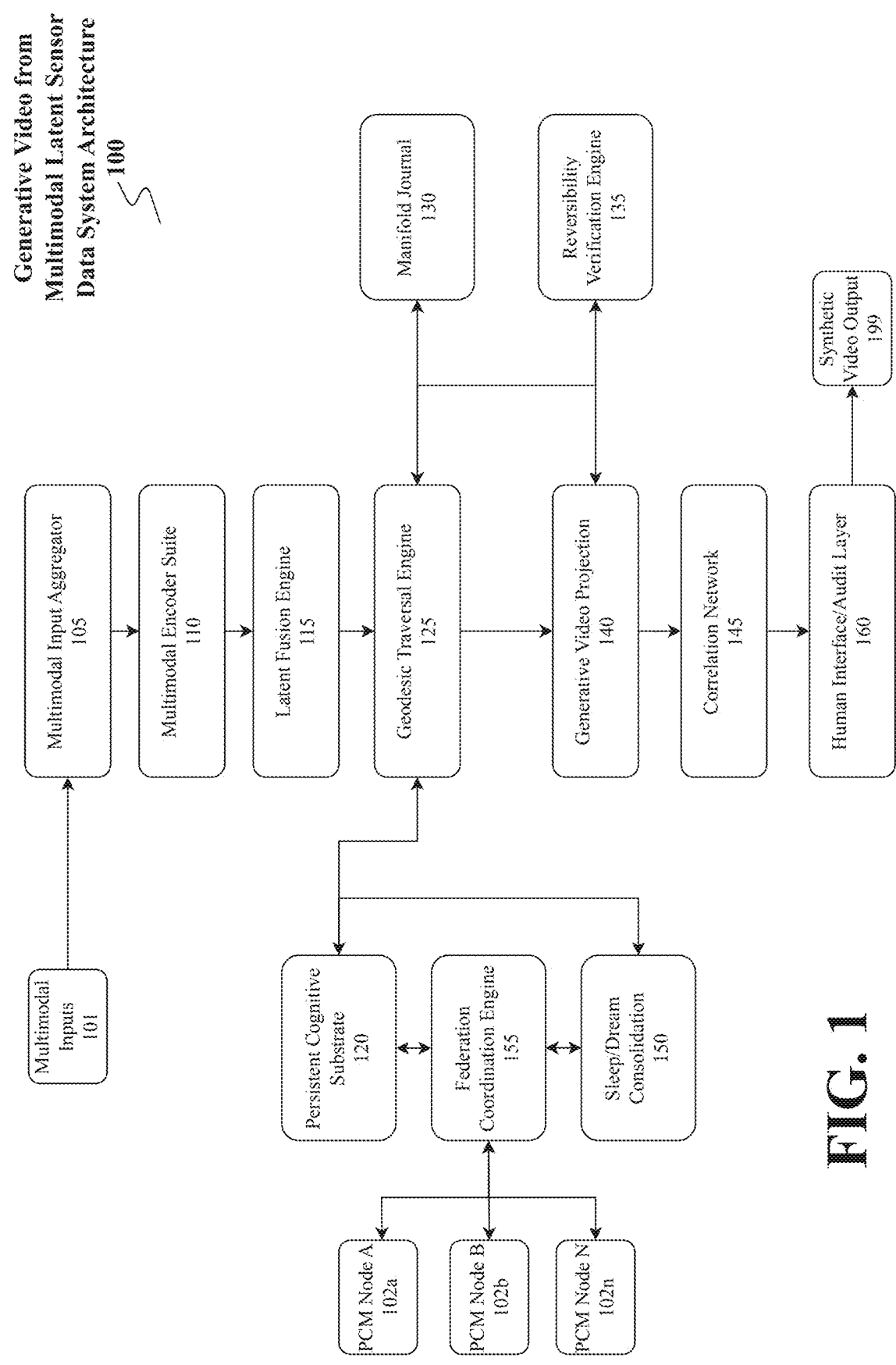
FIG. 1 illustrates an exemplary system architecture of a generative video system showing data flow from multimodal sensor inputs through encoding, fusion, traversal, and projection into synthetic video output.

Conceptual Architecture of a General Video System from Multimodal Latent Sensor Data FIG. 1 is a block diagram illustrating an exemplary architecture of a generative video system from multimodal latent sensor data 100, in an embodiment. A multimodal input aggregator 105 receives and buffers heterogeneous sensor data streams 101, including acoustic signals, thermal imaging data, distributed acoustic sensing fiber-optic measurements, internet-of-things telemetry, radar or sonar returns, textual annotations, and geospatially tagged metadata. The multimodal input aggregator 105 normalizes temporal synchronization across disparate sampling rates and tags each input stream with modality identifiers and contextual metadata. Timestamped and modality-tagged sensor packets from the aggregator 105 are provided to a multimodal encoder suite 110, which transforms each modality into a modality-specific latent embedding within a corresponding subspace of a latent manifold. Each encoder preserves modality-specific geometric properties such as temporal coherence in acoustic signals or spatial gradients in thermal imagery.

A latent fusion engine 115 receives the modality-specific latent vectors from the encoder suite 110 and transforms them into a unified multimodal latent space using cross-modal operators that map between modality subspaces. The latent fusion engine 115 establishes multimodal landmarks as geometric convergence points by minimizing a weighted energy functional that determines geometric centers based on representative latent points from each modality, with weighting coefficients capturing relative salience and distances measured within the manifold. Fused latent states and multimodal landmarks produced by the latent fusion engine 115 are stored within a persistent cognitive substrate 120 functioning as a thought cache that maintains vectorized states, a landmark registry, and semantic-anchor bindings across operational sessions. The persistent cognitive substrate 120 provides retrieval interfaces for cached states and landmarks to support both current processing and historical trajectory analysis.

A geodesic traversal engine 125 retrieves cached states and landmarks from the persistent cognitive substrate 120 to compute navigation paths through the multimodal latent manifold. The traversal engine 125 integrates geodesic equations using local metric tensors and connection coefficients while applying curvature-dependent constraints such as compression-pressure fields corresponding to goal specifications. Navigation proceeds along multiple axes—including spatial, temporal, spectral, and semantic dimensions—with landmarks decomposing extended trajectories into locally stable segments. Each traversal step computed by the traversal engine 125 is recorded in a manifold journal 130 that stores geometric parameters including metric tensors, Christoffel symbols, tangent displacements, and semantic anchors, each entry cryptographically hash-linked for verification.

A reversibility verification engine 135 evaluates navigation fidelity by computing reverse displacement vectors using logarithmic maps derived from journaled geometric state information in the manifold journal 130. The engine 135 measures residual differences between forward and reverse vectors to quantify reversible fidelity and initiates corrective refinement when residuals exceed defined tolerances. Upon validation, a generative video projection subsystem 140 receives the geodesic trajectories from the traversal engine 125 and projects points along each trajectory into corresponding visual frames using a Lorentzian autoencoder configured to preserve temporal causality under a pseudo-Riemannian metric. The projection subsystem 140 decodes latent positions into spatial, spectral, and semantic visual components to produce synthetic video frames that express multimodal relationships among the sensor inputs rather than reconstructing pre-existing footage.

A correlation network 145 enhances the synthesized frames from the projection subsystem 140 through spatial, temporal, and cross-modal correlation analysis. The correlation network 145 applies residual-correction models to recover details attenuated during latent compression and maintains frame-to-frame coherence using optical-flow constraints. Enhanced video frames generated by the correlation network 145 are presented through a human interface and audit layer 160, which provides video output 199 together with provenance records showing reasoning paths, rewind and replay controls, and cryptographically verifiable audit trails for operator review.

Parallel background processing is performed by a sleep and dream consolidation engine 150, which operates during off-task or idle periods to analyze historical trajectories stored in the persistent cognitive substrate 120. The consolidation engine 150 strengthens frequently co-activated landmarks, prunes landmarks with low recurrence or high residual error, merges proximate landmarks into higher-order schemas, and generates counterfactual video scenarios by perturbing stored trajectories within bounded reversibility criteria. A federation coordination engine 155 exchanges multimodal landmarks and trajectories with remote generative video systems 102a-102n via, for example, fiber-transport maps that translate coordinates and geometric structures between latent manifolds. The coordination engine 155 computes round-trip audits between transmitted and received structures to quantify divergence and maintain synchronization of shared cognitive context, enabling multiple systems to generate consistent synthetic video outputs representing a common situational environment while preserving local auditability and persistence.

In an embodiment, data flow through generative video system 100 progresses from raw sensor acquisition through geometric transformation to synthetic visual output. Heterogeneous sensor streams 101 entering multimodal input aggregator 105 undergo temporal alignment and modality classification before transformation into high-dimensional latent vectors by multimodal encoder suite 110, with each modality maintaining its native geometric structure within dedicated embedding subspaces. Latent fusion engine 115 applies cross-modal projection operators to map these distributed embeddings into a unified manifold where multimodal landmarks emerge at convergence points of correlated sensor evidence, creating a topologically coherent representation that persistent cognitive substrate 120 serializes for long-term storage and retrieval. Geodesic traversal engine 125 navigates this unified manifold by computing optimal paths between landmark waypoints while manifold journal 130 records geometric state at each step, enabling reversibility verification engine 135 to validate round-trip fidelity through logarithmic map computations. Validated trajectories flow to generative video projection subsystem 140 for decoding into visual frames through Lorentzian transformation, with correlation network 145 applying residual refinements to enhance spatiotemporal coherence before final presentation through human interface and audit layer 160. Parallel feedback paths enable sleep and dream consolidation engine 150 to adaptively reorganize the manifold geometry based on usage patterns, while federation coordination engine 155 synchronizes landmarks across distributed nodes 102a-102n to maintain consensus representations for shared situational awareness.

Figure 2:
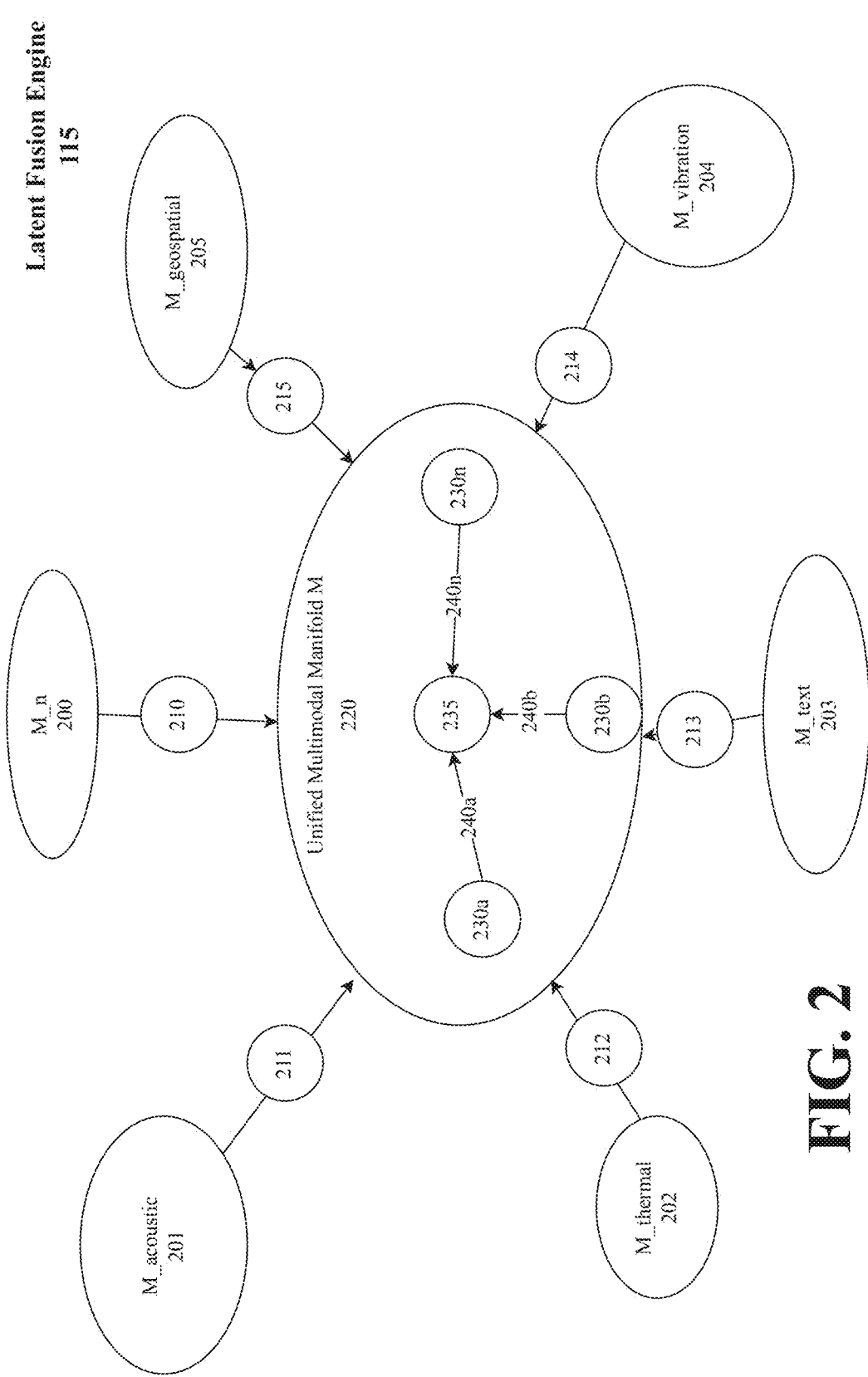
FIG. 2 illustrates multimodal fusion operations within the latent fusion engine, showing modality-specific subspaces, cross-modal projection operators, and formation of multimodal landmarks in a unified manifold.

FIG. 2 is a block diagram illustrating multimodal fusion detail within latent fusion engine 115, in an embodiment.

Illustrated are modality-specific embedding subspaces 200 representing distinct data domains in an embodiment: an acoustic subspace 201, a thermal subspace 202, a text and semantic subspace 203, a distributed acoustic sensing and vibration subspace 204, and a geospatial subspace 205. Each subspace maintains its native geometric structure within a corresponding high-dimensional real space, preserving modality-specific relationships such as temporal sequence, spatial gradient, or semantic hierarchy.

Cross-modal operators 210 establish mappings between these modality subspaces and a unified multimodal manifold 220. Individual operators as illustrated an acoustic-to-visual operator 211 projecting acoustic embeddings into visual coordinates, a thermal-to-visual operator 212 mapping thermal signatures to visual representations, a text-to-anchor operator 213 converting textual metadata into semantic anchors, a vibration-to-spatial operator 214 transforming distributed acoustic sensing data into spatial coordinates, and a geospatial-to-spatial operator 215 aligning geographic positions with the manifold's spatial dimensions. Each operator preserves relevant geometric relationships while enabling cross-modal correspondence within the unified multimodal manifold 220.

The unified multimodal manifold 220 functions as a fused latent space where heterogeneous sensor modalities converge into a coherent geometric representation. Within this manifold, multiple multimodal landmarks 230a-n form as convergence points where signals from different modalities coalesce. A primary converged state 235 represents an optimal geometric center determined through energy minimization. Convergence paths 240a-n illustrate how embeddings from each modality subspace 201-205 project toward the converged state 235, with path geometry defined by weighted geodesic distances and modality salience factors.

Each multimodal landmark 230a-n is computed by minimizing an energy functional $$E(z) = \sum_i w_i\, d_i^2(z, x_i) + \eta\, P(z),$$

where $(w_i)$ denotes a salience weighting factor, $(d_i(z, x_i))$ represents the geodesic distance between candidate position $(z)$ and modality embedding $(x_i)$, and $(P(z))$ is a compression-pressure field acting as a regularization term. Stability of a landmark is achieved when the gradient of the compression-pressure field at the converged state $(z^\wedge)$ approaches zero $((\nabla P(z^\wedge) \approx 0))$ and the Hessian of the pressure field is positive definite $((\mathrm{Hess}(P)(z^*) \succ 0))$, indicating a local minimum within the energy landscape.

Fusion techniques implemented by the latent fusion engine 115 include weighted geometric-center computation, attention-based weighting mechanisms that dynamically adjust cross-modal salience, curvature-aware alignment that respects the intrinsic geometry of the manifold, and geodesic-distance minimization to identify shortest paths between modality embeddings. The arrangement shown in FIG. 2 demonstrates how latent fusion engine 115 transforms distributed, heterogeneous sensor representations into a unified geometric space where multimodal relationships can be traversed, analyzed, and subsequently projected into synthetic-video generation processes.

In an embodiment, data flow through latent fusion engine 115 begins as modality-specific latent vectors enter from multimodal encoder suite 110, with each vector residing in its respective embedding subspace 201-205 and carrying preserved geometric properties such as temporal sequences in acoustic subspace 201 or spatial gradients in thermal subspace 202. Cross-modal projection operators 210 transform these distributed embeddings through learned mappings that preserve relevant structural relationships while enabling geometric correspondence, such as acoustic-tovisual operator 211 mapping sound frequency patterns to visual texture variations or text-to-anchor operator 213 converting semantic descriptions into spatial positions within unified multimodal manifold 220. As projected embeddings converge within unified multimodal manifold 220, the system computes pairwise geodesic distances between modality representations and iteratively adjusts candidate landmark positions to minimize the weighted energy functional, with salience weights w_i modulating each modality's contribution based on signal quality, relevance, or user-specified importance factors. The optimization process continues until convergence criteria are satisfied, producing multimodal landmarks 230a-n at stable geometric centers where compression pressure gradients approach zero and the energy landscape exhibits positive definite curvature. Converged state 235 and surrounding landmarks 230a-n are then serialized as tuples containing position vectors, weight coefficients, and stability metrics for transmission to persistent cognitive substrate 120, where they become available for geodesic traversal operations and long-term storage across system sessions.

Figure 3:
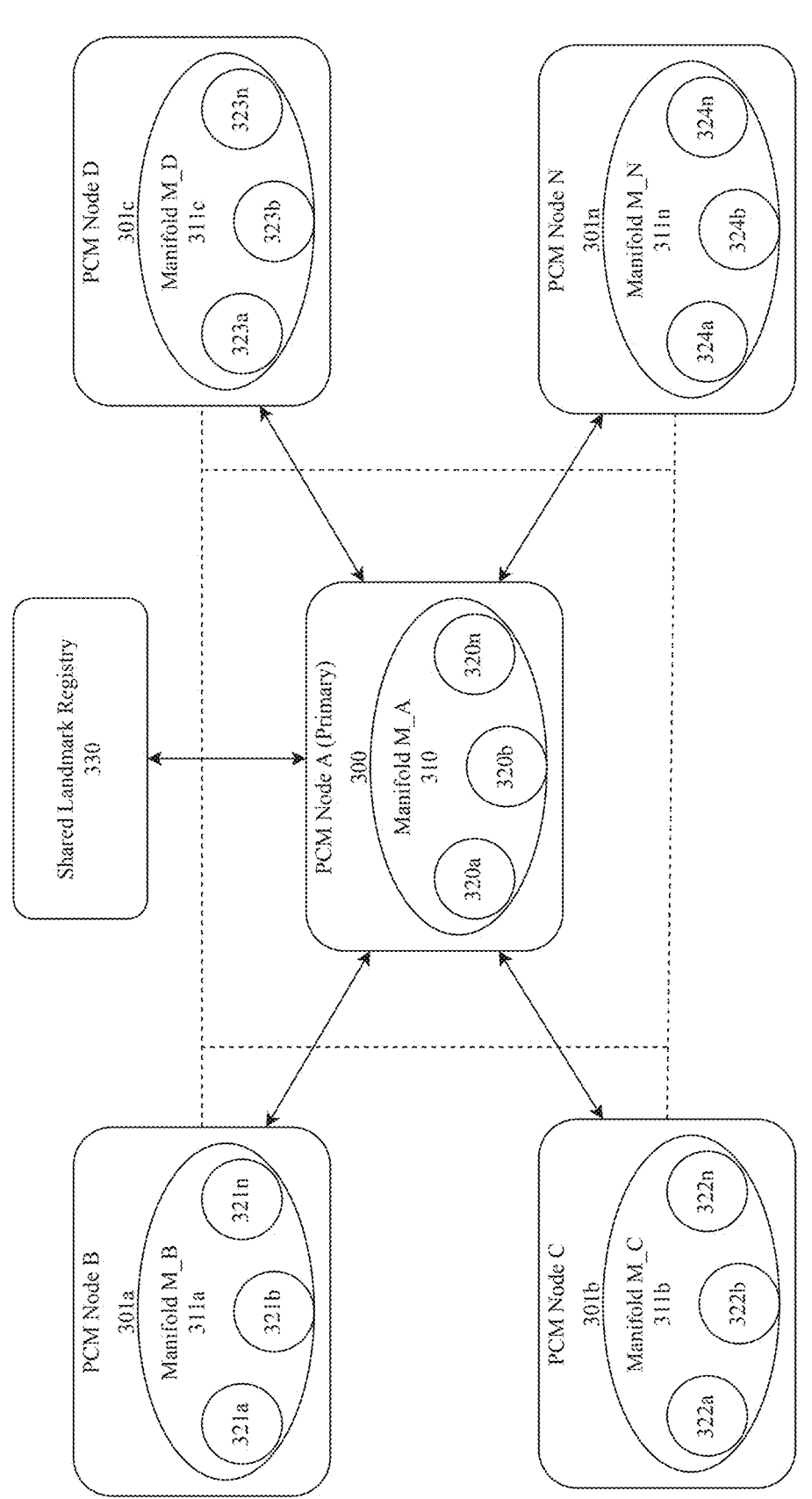
FIG. 3 illustrates the federated architecture of a generative video system, depicting multiple cognitive nodes exchanging multimodal landmarks through fiber-transport maps for synchronized operation.

FIG. 3 is a block diagram illustrating an exemplary federation architecture of a generative video system from multimodal latent sensor data 100, in an embodiment. A primary system node 300 maintains a manifold $M_a$ 310 containing multimodal landmarks 320a-n representing geometric convergence points where heterogeneous sensor signals coalesce within a unified latent space. Additional federated system nodes 301a-n operate in coordination with primary node 300, each maintaining a corresponding manifold M_b-M_n 311a-n with its own multimodal landmarks 321a-n through 324a-n. A shared landmark registry 330 coordinates synchronization of landmark structures across federated nodes while preserving local geometric autonomy within each manifold.

The primary system node 300 exchanges multimodal landmarks 320a-n with federated nodes 301a-n through fiber-transport maps that translate geometric structures between manifolds while preserving topological relationships. Each fiber-transport map, mapping from manifold $M_a$ 310 to a federated manifold such as M_b 311a, implements a differentiable transformation that maintains geodesic distances within a specified tolerance. These mappings enable landmarks from one manifold to be reconstructed in another while preserving their geometric relationships. Round-trip audit paths confirm that landmarks transmitted from primary node 300 to a federated node 301a and returned can be reconstructed with residual error below a defined threshold, computed as the logarithmic-map distance between original and reconstructed positions. The shared landmark registry 330 receives landmark updates from all participating nodes and maintains a consensus representation that reflects geometric structures common across multiple manifolds.

Data flow through the federated architecture begins when the primary system node 300 generates or updates multimodal landmarks 320a-n based on local sensor inputs and latent-manifold traversals. These landmarks, represented as tuples containing position vectors and salience weights, are transmitted to federated nodes 301a-n through fiber-transport operations mapping from manifold $M_a$ 310 to target manifolds 311a-n. Each receiving node reconstructs transmitted landmarks within its local geometric context, adapting positions to account for differences in manifold curvature and metric structure while preserving relative relationships among landmark clusters. Federated nodes 301a-n generate synthetic-video outputs using both local and received landmarks, enabling distributed visualization of a shared situational environment from multiple geometric perspectives.

Synchronization mechanisms coordinate landmark evolution across federated nodes through periodic exchanges of landmark updates with shared registry 330. The registry computes consensus positions for landmarks appearing in multiple manifolds by minimizing an alignment functional that balances geometric consistency with local manifold constraints. Divergence monitoring tracks bidirectional differences between landmark representations at different nodes and initiates reconciliation procedures when discrepancies exceed operational thresholds. This federated exchange allows multiple generative-video systems to maintain approximate alignment of their internal geometric representations while supporting independent local processing and adaptation.

Round-trip audit procedures assess the reversibility of federated exchanges by computing residual errors for landmarks traversing from primary node 300 to a federated node 301a and returning. A landmark in manifold $M_a$ 310 is mapped through fiber transport to a position in manifold M_b 311a, then reverse-mapped to reconstructed a position in $M_a$ 310. Residual error is measured as the geodesic distance between p and p'. Acceptable federation requires this residual to remain below a specified tolerance—on the order of machine precision for critical landmarks. Failed round-trip validations trigger refinement procedures that adjust fiber-transport parameters to improve geometric fidelity.

Benefits of the federated architecture include distributed processing capacity across geographic locations, enabling sensor fusion and video generation at edge nodes while maintaining global geometric coherence through landmark synchronization. Multiple federated nodes 301a-n process local sensor streams independently, establishing regional landmarks that reflect local multimodal evidence while participating in consensus formation for shared situational awareness. Federation coordination mechanisms balance local autonomy with global consistency, allowing each node to adapt its manifold structure to local conditions while maintaining sufficient alignment for reliable landmark exchange and synchronized video-synthesis operations.

Figure 4:
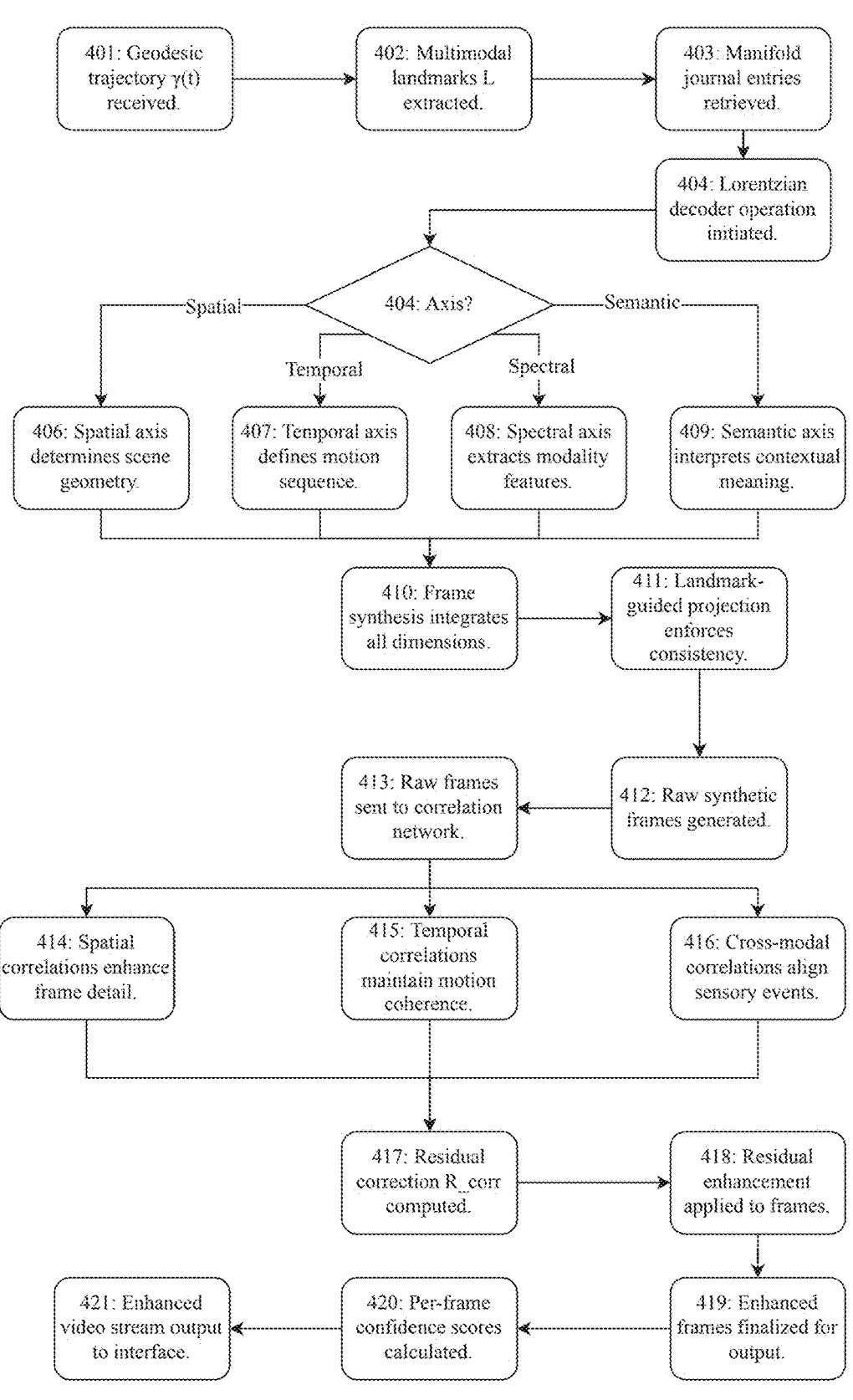
FIG. 4 illustrates the video generation pipeline of a generative video system, showing transformation of validated latent trajectories into synthetic video frames and correlation-enhanced output.

FIG. 4 is a flow diagram illustrating an exemplary video generation pipeline of a generative video system 100, in an embodiment. The process begins when the generative video projection subsystem 140 receives a geodesic trajectory γ(t) that has been computed by the geodesic traversal engine 125 and validated by the reversibility verification engine 135, representing the path through the unified multimodal latent space that will be transformed into synthetic video 401. The projection subsystem 140 extracts multimodal landmarks L from the received trajectory, where each landmark corresponds to a geometric convergence point previously established by the latent fusion engine 115 and stored in the persistent cognitive substrate 120 402. The subsystem then retrieves the corresponding manifold journal entries J(p,t) from the manifold journal 130, which contain geometric-state information including metric tensors, connection coefficients, tangent displacements, and semantic anchors recorded during the original traversal 403.

The generative video projection subsystem 140 initiates a Lorentzian-decoder operation employing a pseudo-Riemannian metric to preserve temporal causality while transforming latent positions into visual representations 404. The decoder performs multi-axis synthesis by decomposing the trajectory along four fundamental dimensions that govern the video-generation process 405. Along the spatial axis, the decoder determines camera perspectives and object positions within the three-dimensional scene space, mapping latent coordinates to physical locations in the generated frames 406. Temporal-axis processing establishes the frame sequence and motion dynamics, ensuring smooth transitions and physically plausible movement patterns across the video timeline 407. Through spectral-axis analysis, the system extracts frequency content and modality-specific features from the latent representation, incorporating characteristics derived from the original acoustic, thermal, or other sensor modalities 408. Semantic-axis processing interprets object identities and scene context embedded in the trajectory, drawing from the text-to-anchor operators previously applied by the latent fusion engine 115 409.

These four decomposed streams converge at the frame-synthesis engine within the generative video projection subsystem 140, which integrates the multidimensional information into coherent visual representations 410. The synthesis engine applies landmark-guided projection, wherein each multimodal landmark L influences visual generation within its geometric neighborhood, enforcing consistency with the original sensor evidence that created these convergence points 411. The projection subsystem 140 produces raw synthetic frames V_raw(t), representing the initial visual interpretation of the geodesic trajectory before enhancement 412.

The raw frames are transmitted to the correlation network 145, which analyzes and enhances the generated video through multiple correlation mechanisms 413. The correlation network 145 performs spatial analysis to identify and reinforce recurring patterns within individual frames, enhancing edges and textures using learned priors from the persistent cognitive substrate 120 414. Simultaneously, the network executes temporal processing to evaluate frame-to-frame consistency, applying optical-flow constraints to maintain motion coherence and interpolate missing details from adjacent frames 415. The correlation network 145 also conducts cross-modal analysis to ensure that visual events correspond appropriately to the underlying multimodal sensor data, such as enhancing visual signatures when acoustic spikes or thermal hotspots were present in the original sensor inputs 416.

These three correlation streams feed into the residual-enhancement module of the correlation network 145, which computes R_corr as a learned residual correction that restores information potentially lost during latent compression 417. The network applies this residual enhancement to produce enhanced video frames V(t) according to the relationship frame_enhanced=frame_raw+R_corr(frame_raw, context), where context includes the multimodal sensor evidence and landmark positions 418. The enhanced frames emerge from the correlation network 145 with restored detail, improved spatiotemporal consistency, and stronger correspondence to the original multimodal evidence 419.

The generative video projection subsystem 140 calculates per-frame confidence scores based on proximity to multimodal landmarks and the strength of correlation with the original sensor modalities, providing a quality metric for each generated frame 420. The system outputs the enhanced video stream V(t) comprising the complete sequence of synthetic frames, confidence scores, and associated metadata to the human interface and audit layer 160 for display and verification 421. This completes the video-generation pipeline, transforming abstract geodesic trajectories through multimodal latent space into concrete, auditable synthetic video that visually represents the convergence of heterogeneous sensor evidence while maintaining geometric consistency and reversibility throughout the generation process.

Figure 5:
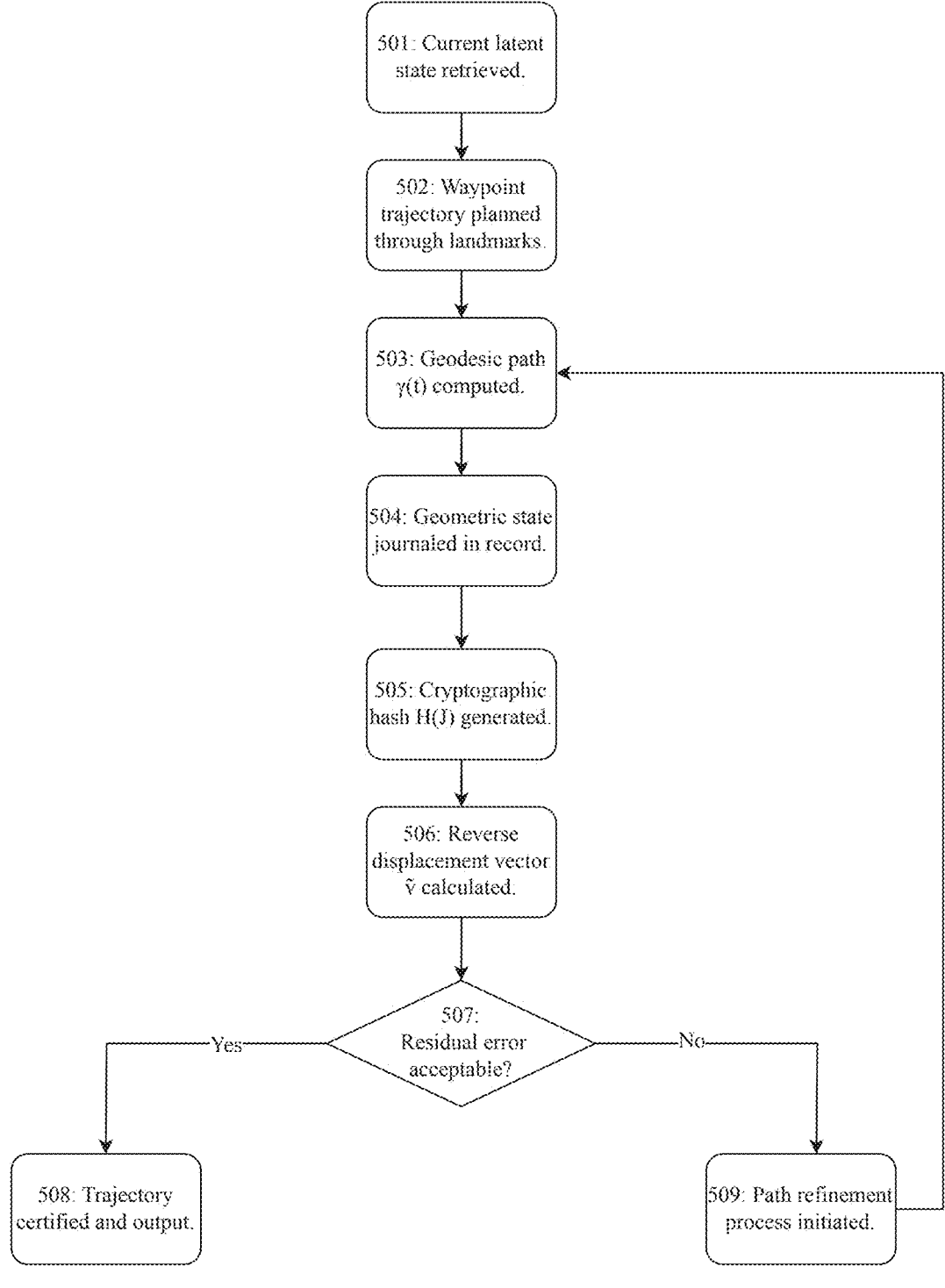
FIG. 5 illustrates geodesic traversal and journaling operations of a generative video system, showing computation of manifold trajectories, recording of geometric state, and verification of reversibility.

FIG. 5 is a flow diagram illustrating exemplary geodesic traversal and journaling operations of a generative video system 100, in an embodiment. The process begins when the geodesic traversal engine 125 retrieves the current latent state z_current from the persistent cognitive substrate 120, along with multimodal landmarks L that serve as waypoints for navigation through the unified multimodal manifold 501. The traversal engine 125 plans a waypoint trajectory by decomposing the path from initial position p through a sequence of multimodal landmarks $\Lambda_1$, $\Lambda_2$ to the target position q, where each landmark represents a stable geometric convergence point previously established by the latent fusion engine 115 502.

The geodesic traversal engine 125 computes the geodesic path $\gamma(t)$ by integrating the geodesic equation $$d^2\gamma/dt^2 + \Gamma(d\gamma/dt)^2 = 0$$

using the metric tensor and Christoffel symbols stored in the persistent cognitive substrate 120, producing a smooth trajectory through the latent manifold that minimizes the action functional while respecting the manifold's intrinsic geometry 503. The computed trajectory and associated geometric state are transmitted to the manifold journal 130, which records a comprehensive journal entry J(p,t) containing the metric tensor g_t, connection coefficients $\Gamma$, tangent displacements v, tangent basis B_p, and semantic anchors $\sigma$_p at each point along the trajectory 504.

The manifold journal 130 computes a cryptographic hash H(J) of each journal entry, creating an immutable record that enables verification of the navigation path and maintains an audit trail linking every geometric operation to its computational context 505. The reversibility verification engine 135 receives the journaled trajectory and computes the reverse displacement vector ṽ=log_p(q) using the logarithmic map derived from the stored geometric state, enabling validation of the bidirectional navigability of the computed path 506.

The reversibility verification engine 135 evaluates whether the residual error $\delta$=‖ṽ−v‖_g between the forward and reverse displacement vectors falls within the acceptable tolerance threshold ε_rt, where the norm is computed with respect to the local metric tensor g_t 507. When the residual error satisfies the threshold condition $\delta$≤ε_rt, the verification engine certifies the trajectory as reversible and outputs the validated geodesic trajectory $\gamma(t)$ to the generative video projection subsystem 140 for subsequent video generation 508. If the residual error exceeds the threshold, the verification engine triggers a trajectory-refinement process that returns control to the geodesic traversal engine 125, which recomputes the geodesic path using adjusted parameters or alternative landmark sequences until reversibility criteria are met 509.

Figure 6:
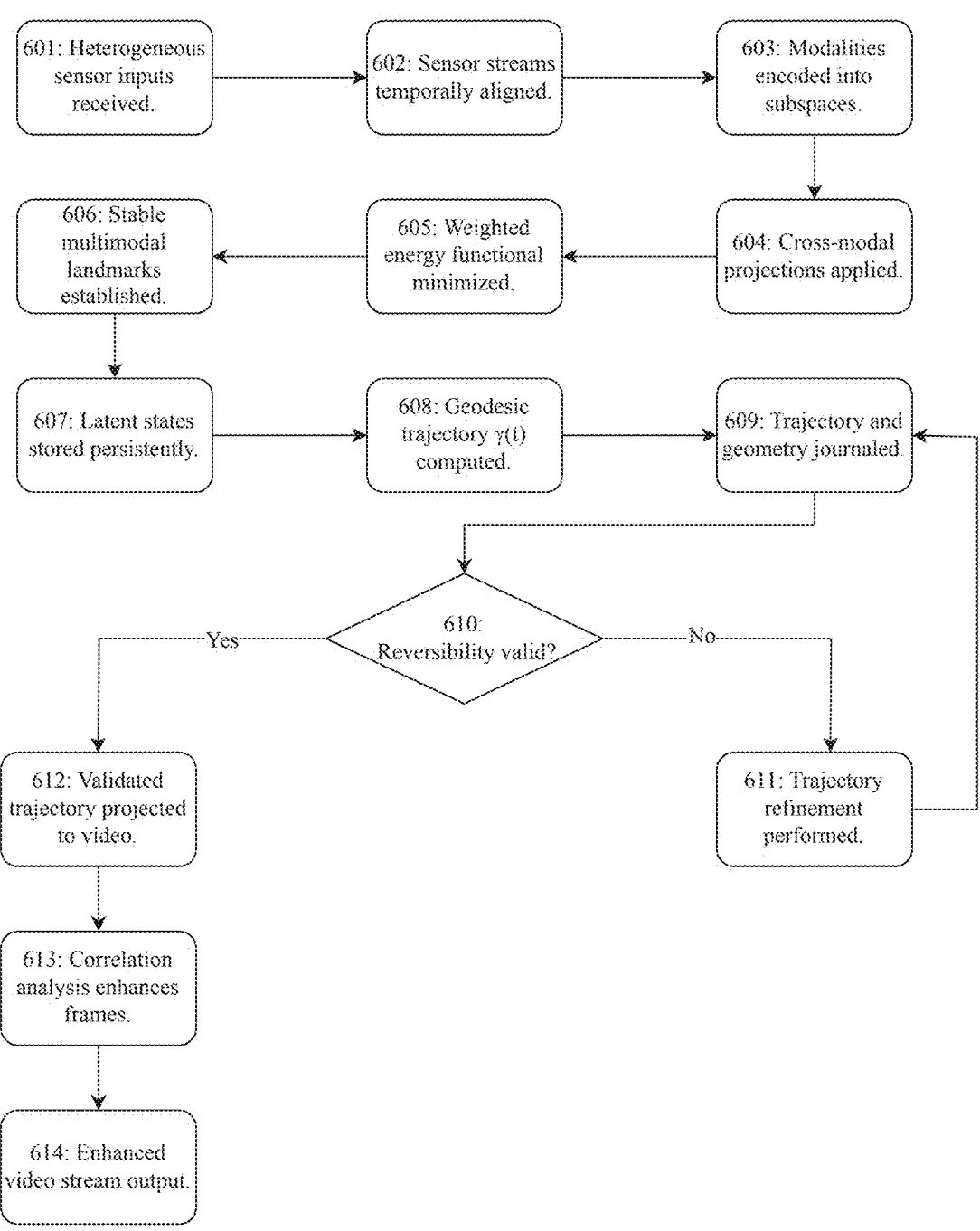
FIG. 6 illustrates the main processing flow of a generative video system from acquisition of multimodal inputs through encoding, fusion, traversal, validation, and video generation.

FIG. 6 is a flow diagram illustrating exemplary main processing flow of a generative video system 100, in an embodiment. The process begins when the multimodal input aggregator 105 receives heterogeneous sensor inputs including acoustic signals, thermal imaging data, distributed acoustic-sensing fiber-optic data, internet-of-things telemetry, radar or sonar returns, and geospatial textual annotations from multiple sensor sources 601. The multimodal input aggregator 105 performs temporal alignment across the disparate sampling rates and tags each input stream with modality identifiers and contextual metadata to create synchronized sensor packets 602.

The multimodal encoder suite 110 receives the time-stamped and modality-tagged sensor packets and encodes each modality into its corresponding embedding subspace M_i within the latent manifold, preserving modality-specific geometric properties such as temporal coherence in acoustic signals or spatial gradients in thermal imagery 603. At this stage, the latent fusion engine 115 applies cross-modal projection operators, including acoustic-to-visual, thermal-to-visual, and text-to-anchor mappings, to transform the distributed embeddings into compatible geometric representations 604.

The latent fusion engine 115 fuses the projected embeddings into a unified multimodal manifold M by minimizing a weighted energy functional, $$E(z) = \Sigma w_i d_{i2}(z, x_i),$$

that determines a geometric center from representative latent points of each modality 605. The fusion engine 115 establishes multimodal landmarks L as geometric convergence points where heterogeneous sensor signals coalesce, each landmark satisfying stability criteria including a near-zero compression-pressure gradient and a positive definite Hessian 606.

Once landmarks are established, the persistent cognitive substrate 120 stores the fused latent states and multimodal landmarks as vectorized thoughts within its thought cache, maintaining these structures persistently across system sessions 607. The geodesic traversal engine 125 retrieves cached states and landmarks to compute a geodesic trajectory $\gamma(t)$ through the unified latent space by integrating the geodesic equation using stored metric tensors and connection coefficients 608.

The manifold journal 130 records the computed trajectory along with comprehensive geometric-state information including metric tensors, Christoffel symbols, tangent displacements, and semantic anchors, creating hash-linked cryptographic entries for auditability 609. The reversibility verification engine 135 computes round-trip residuals between forward and reverse displacement vectors to evaluate compliance with reversibility criteria 610.

If the residual error exceeds the tolerance threshold, the reversibility verification engine 135 initiates parameter refinement in the geodesic traversal engine 125, which recomputes the trajectory using adjusted landmark sequences or modified integration parameters 611. Following successful validation, the generative video projection subsystem 140 projects the verified geodesic trajectory into synthetic video frames using a Lorentzian autoencoder that preserves temporal causality under a pseudo-Riemannian metric 612.

The correlation network 145 performs spatial, temporal, and cross-modal correlation analysis to enhance the raw synthesized frames, restoring details attenuated during latent compression and ensuring consistency with the original multimodal sensor evidence 613. The human interface and audit layer 160 outputs the enhanced video stream V(t), containing the full frame sequence derived from multimodal sensor inputs through geometrically auditable latent operations 614.

Figure 7:
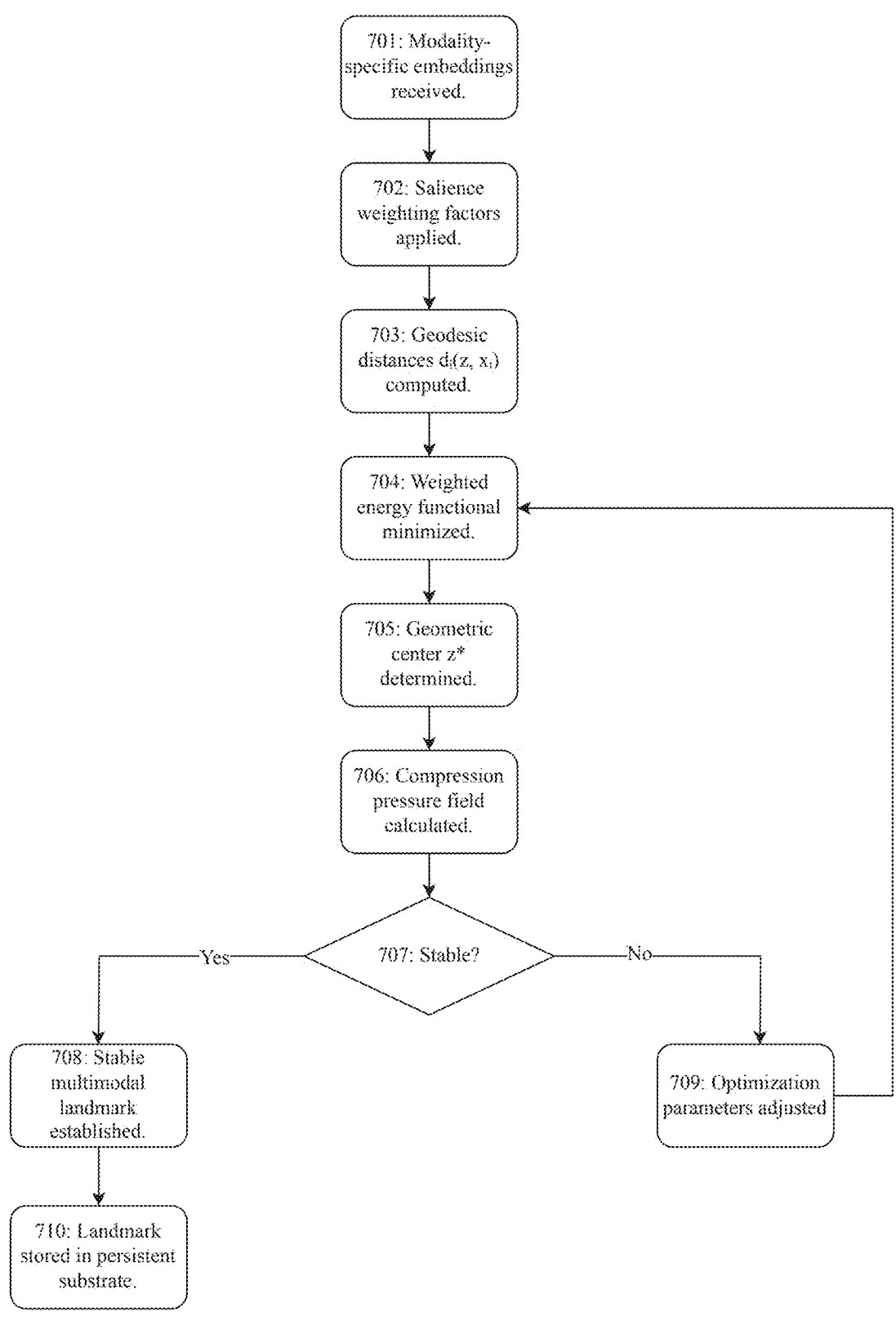
FIG. 7 illustrates multimodal landmark establishment within the latent fusion engine, showing weighted energy minimization and stability verification for convergence of heterogeneous modalities.

FIG. 7 is a flow diagram illustrating exemplary multimodal landmark establishment flow of a generative video system 100, in an embodiment. The process begins when the latent fusion engine 115 receives modality-specific embeddings x_i from the multimodal encoder suite 110, where each embedding represents a latent vector from a distinct modality subspace such as M_acoustic, M_thermal, or M_text 701. The latent fusion engine 115 applies salience weighting factors w_i to each modality embedding, where the weights capture the relative importance or signal quality of each modality based on sensor confidence metrics and operational priorities 702.

The latent fusion engine 115 computes geodesic distances d_i(z, x_i) between candidate landmark positions z and each modality embedding x_i within the unified multimodal manifold M, using the manifold's intrinsic metric tensor to measure geometric separation 703. The latent fusion engine 115 minimizes the weighted energy functional $\Sigma w\_i \cdot d\_i^2(z, x\_i)$ through iterative optimization, seeking the position that minimizes the total weighted squared distances to all modality embeddings 704.

The optimization process yields a geometric center z* that represents the optimal convergence point for the multimodal evidence, balancing the contributions from each modality according to their salience weights 705. The latent fusion engine 115 calculates the compression pressure field P(z*) at the candidate landmark position, derived from the Ricci curvature of the manifold at that point 706.

The latent fusion engine 115 evaluates stability criteria by verifying that the gradient of the compression pressure field at z* approaches zero ($\nabla P(z*)\approx 0$) and that the Hessian of the pressure field is positive definite ($\text{Hess}(P)(z*)>0$), ensuring the landmark occupies a stable minimum in the energy landscape 707. When the stability criteria are satisfied, the latent fusion engine 115 creates a new multimodal landmark L or updates an existing landmark at position z* with the associated weight coefficients and stability metrics 708. When the stability criteria are not met, the latent fusion engine 115 adjusts the optimization parameters such as step size, weight distribution, or convergence tolerance and returns to the energy minimization step to find an alternative geometric center 709. The established or updated multimodal landmark is transmitted to the persistent cognitive substrate 120, which stores the landmark tuple containing position vectors, weight coefficients, and stability metrics within its thought cache for persistent availability across system sessions 710.

FIG. 8 is a flow diagram illustrating exemplary reversibility validation of a generative video system 100, in an embodiment. The process begins when the reversibility verification engine 135 retrieves a journal entry J(p,t) from the manifold journal 130, where the journal entry contains the complete geometric state information recorded during the forward traversal from position p at time t 801. The reversibility verification engine 135 extracts the geometric-state components from the retrieved journal entry, including the metric tensor $g_t$ evaluated at position p, the Christoffel connection coefficients $\Gamma$ at the traversal point, the tangent displacement vector v that was used in the forward navigation, and the tangent basis $B_p$ representing the local coordinate frame 802.

Using the extracted geometric-state information, the reversibility verification engine 135 computes the reverse displacement vector $\hat{v}$ by applying the logarithmic map $\log_p(q)$, which determines the tangent vector that would be required to navigate from the current position p to the target position q using the stored metric geometry 803. For clarity, the logarithmic map $\log_p(q)$ and its corresponding exponential map $\exp_p(v)$ are defined over the same pseudo-Riemannian manifold M, ensuring mathematically reversible mapping between positions and tangent vectors.

The reversibility verification engine 135 then calculates the residual error $\delta$ as the norm of the difference between the computed reverse displacement vector $\hat{v}$ and the original forward displacement vector v, where the norm is evaluated with respect to the local metric tensor $g_t$ to preserve geometric consistency 804. The engine compares the calculated residual error $\delta$ against a predefined reversibility tolerance $\varepsilon\_rt$ to determine whether the trajectory satisfies the reversibility requirements for auditable video generation 805.

When the residual error satisfies the condition $\delta \leq \varepsilon\_rt$, the reversibility verification engine 135 records a reversible-status flag indicating that the forward and reverse navigation paths are consistent within acceptable bounds 806. Following successful certification, the engine outputs the validated geodesic trajectory $\gamma(t)$ to the generative video projection subsystem 140 for subsequent transformation into synthetic video frames 807.

When the residual error exceeds the tolerance threshold ($\delta>\varepsilon\_rt$), the reversibility verification engine 135 initiates a Newton-Kantorovich refinement procedure to reduce the residual error and improve the geometric consistency of the trajectory 808. The geodesic traversal engine 125 then adjusts trajectory parameters, including integration step size, numerical precision, and landmark waypoint selection, based on refinement signals from the reversibility verification engine 135 809. The geodesic traversal engine 125 recomputes the geodesic path using the adjusted parameters, generating a refined trajectory that better preserves the manifold's geometric structure. The updated trajectory is returned to the reversibility verification engine 135 for re-validation 810.

Figure 9:
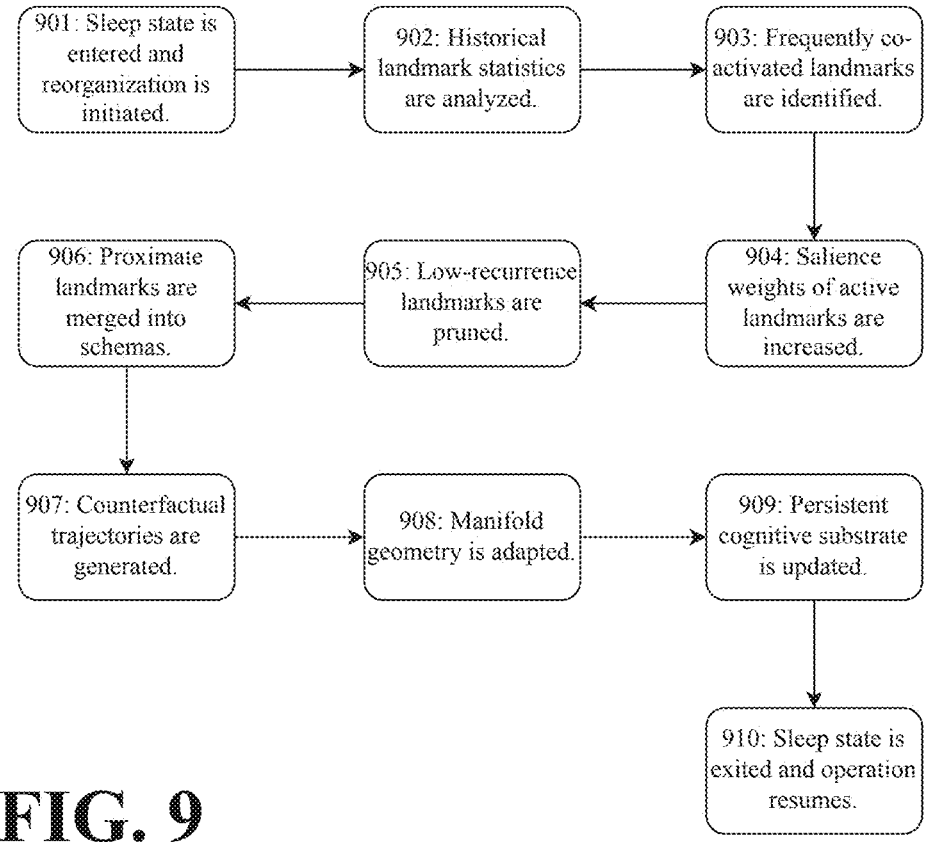
FIG. 9 illustrates sleep and dream consolidation operations of a generative video system, showing autonomous reorganization of landmarks, metric adaptation, and generation of counterfactual trajectories during idle periods.

FIG. 9 is a flow diagram illustrating exemplary sleep consolidation operations of a generative video system 100, in an embodiment. The process begins when the sleep and dream consolidation engine 150 enters a sleep state and initiates autonomous reorganization of the manifold geometry and landmark structures during an off-task or idle period, without active video generation tasks 901. The sleep and dream consolidation engine 150 analyzes historical landmark usage statistics retrieved from the persistent cognitive substrate 120, examining activation frequencies, co-occurrence patterns, and traversal histories for each multimodal landmark stored in the thought cache 902.

The engine identifies frequently co-activated landmarks by analyzing correlation matrices and temporal proximity patterns to determine which landmarks consistently appear together in successful geodesic trajectories 903. The engine increases the salience weighting factors $w_i$ of high-usage landmarks according to the recurrence relationship $dw_i/dt \propto R(z_i)$, where $R(z_i)$ represents the activation or recurrence rate associated with each landmark position $z_i$ 904. The engine prunes landmarks with low recurrence rates or excessive residual errors by gradually reducing their weights and removing them from the persistent cognitive substrate 120 when their contributions fall below operational thresholds 905.

The engine merges proximate landmarks exhibiting similar activation patterns into higher-order schemas by minimizing a combined energy functional that identifies stable macro-structures within the manifold 906. The engine generates counterfactual trajectories by applying controlled perturbations to stored geodesic paths according to $\gamma\_\delta(t)=\exp_p(v+\delta)$, where $\delta$ represents a bounded perturbation vector that explores nearby regions of the latent manifold while maintaining reversibility constraints 907. The engine adapts the manifold geometry by updating the metric tensor according to the evolution equation $\partial\_\tau\ g_t = -\xi\nabla\_g_t\ P_t + \zeta Hess\_g_t(\log\ \mu_t)$, which smooths high-compression regions and enhances reversible corridors within the latent space 908. The engine updates the persistent cognitive substrate 120 so that consolidated landmarks, refined geometric structures, and counterfactual trajectories are retained across subsequent operational sessions 909. The engine exits the sleep state and returns to active operational mode, having optimized the manifold structure to enhance efficiency and fidelity in future video generation tasks 910.

Figure 10:
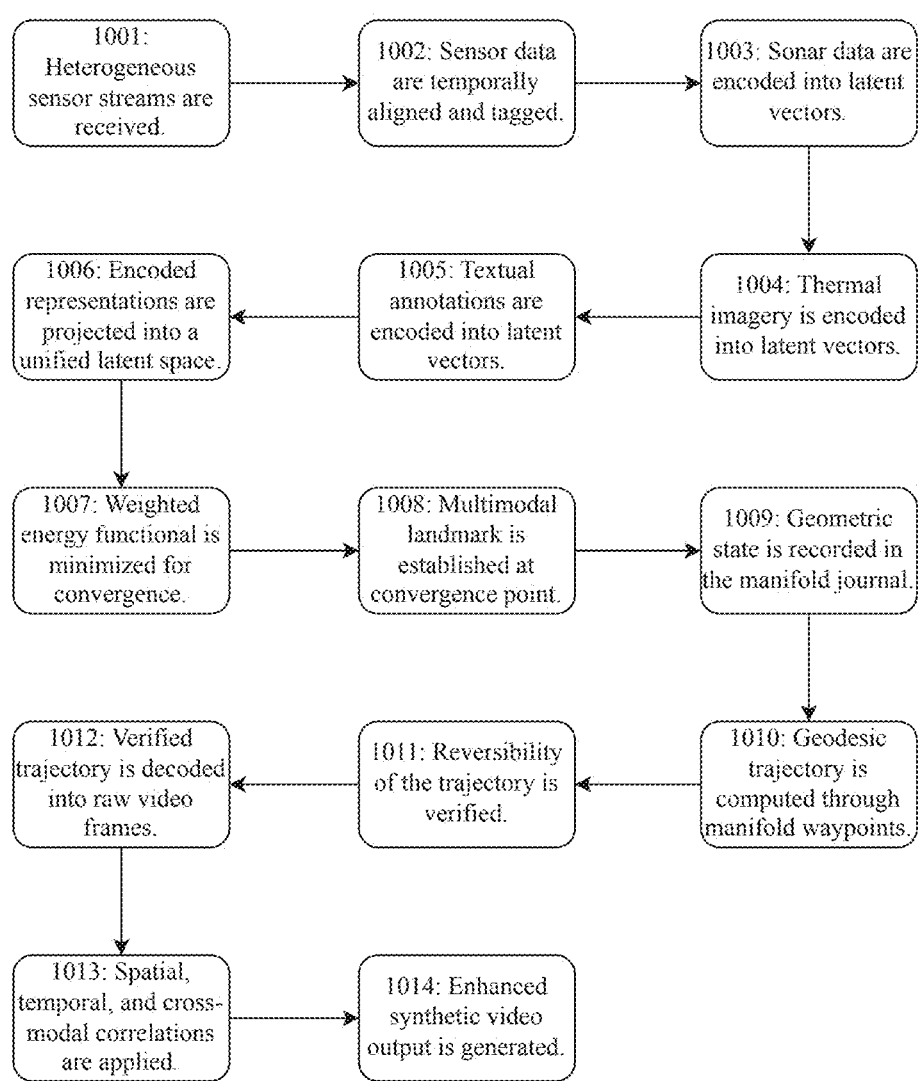
FIG. 10 illustrates video generation from multimodal sensor inputs of a generative video system, showing encod-

FIG. 10 is a flow diagram illustrating exemplary video generation from multimodal sensor inputs of a generative video system 100, in an embodiment. The process begins when the multimodal input aggregator 105 receives heterogeneous sensor streams comprising sonar acoustic data, thermal imaging data, and textual annotations from multiple distributed sensor sources 1001. The multimodal input aggregator 105 performs temporal alignment across the disparate sampling rates of the sonar, thermal, and text inputs and tags each stream with modality identifiers to create synchronized sensor packets for further multimodal encoding 1002.

The multimodal encoder suite 110 encodes the sonar data using a one-dimensional convolutional neural network that transforms the acoustic waveforms into latent vectors within the acoustic embedding subspace M_acoustic, preserving temporal coherence and frequency characteristics 1003. The multimodal encoder suite 110 encodes the thermal imagery using a two-dimensional convolutional neural network that maps temperature distributions into latent vectors within the thermal embedding subspace M_thermal, maintaining spatial gradient information 1004. The multimodal encoder suite 110 encodes the textual annotations using a transformer architecture that projects semantic content into latent vectors within the text embedding subspace M_text, capturing contextual relationships and metadata associations 1005.

The latent fusion engine 115 applies cross-modal projection operators R_ij to map the encoded representations from their modality-specific subspaces into a unified multimodal latent space, with operators including acoustic-to-visual, thermal-to-visual, and text-to-anchor projections 1006. The latent fusion engine 115 minimizes the weighted energy functional $E(z) = \Sigma w\_i \cdot d\_i^2(z, x\_i)$ through iterative optimization to find the geometric center that best represents the convergence of the multimodal evidence 1007. The latent fusion engine 115 establishes a multimodal landmark at the convergence point z* where the sonar, thermal, and textual signals coalesce geometrically, creating a stable reference point within the unified manifold 1008.

The manifold journal 130 records the geometric state at the landmark position, including the metric tensor g_t, Christoffel connection coefficients Γ, tangent displacements, and semantic anchors, creating a cryptographically hash-linked entry for auditability 1009. The geodesic traversal engine 125 computes the geodesic trajectory γ(t) from the established landmark through intermediate waypoints to the target state by integrating the geodesic equation using the stored manifold geometry 1010. The reversibility verification engine 135 verifies that the computed trajectory satisfies reversibility constraints by checking that the round-trip residual error δ remains below the tolerance threshold ε_rt 1011.

The generative video projection subsystem 140 applies a Lorentzian autoencoder to decode the verified geodesic trajectory into raw synthetic video frames V_raw(t), preserving temporal causality through the pseudo-Riemannian metric while transforming latent positions into visual representations 1012. The correlation network 145 then performs spatial, temporal, and cross-modal correlation analysis on the raw frames, enhancing edges and textures while ensuring that visual events correspond appropriately to the underlying sonar peaks and thermal signatures 1013. The network produces the enhanced video output V(t) by applying learned residual corrections to restore details attenuated during latent compression, generating the final synthetic video sequence derived from the multimodal sensor inputs 1014.

Exemplary Computing Environment

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs).

HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a persistent cognitive substrate incorporating a latent manifold with multimodal geometric representations;

encode heterogeneous sensor inputs from a plurality of modalities into modality-specific embedding subspaces within the latent manifold;

project the modality-specific embeddings into a unified multimodal latent space through cross-modal projection operators that map between modality subspaces;

establish multimodal landmarks as geometric convergence points where heterogeneous sensor signals coalesce within the unified latent space;

compute geodesic trajectories through the unified latent space guided by the multimodal landmarks while maintaining reversibility through journaled geometric state;

generate synthetic video output by projecting the geodesic trajectories into visual representations, wherein the synthetic video is derived from the multimodal sensor inputs rather than reconstruction of existing video data;

validate reversibility of the generated synthetic video by computing round-trip residuals between forward projection and reverse navigation paths; and persist the multimodal landmarks and generated trajectories across system sessions through a thought cache that maintains the persistent cognitive substrate.

2. The computer system of claim 1, wherein the cross-modal projection operators comprise:

an acoustic-to-visual operator that maps acoustic sensor data from an acoustic embedding subspace to a visual manifold;

a thermal-to-visual operator that maps thermal sensor data from a thermal embedding subspace to the visual manifold; and a text-to-anchor operator that projects textual metadata into semantic anchors within the visual manifold.

3. The computer system of claim 1, wherein each multimodal landmark is defined by minimizing a weighted energy functional that computes a geometric center based on representative latent points from each modality, weighting coefficients capturing relative salience of each modality, and geodesic distances within the latent manifold.

4. The computer system of claim 1, wherein the software instructions further:

maintain a manifold journal that records geometric state at each traversal step including metric tensors, connection coefficients, tangent displacements, and semantic anchors; and enable cryptographic verification of navigation paths through hash-linked journal entries.

5. The computer system of claim 1, wherein the software instructions further:

execute sleep-state consolidation operations that strengthen frequently co-activated multimodal landmarks, prune multimodal landmarks with low recurrence, and merge proximate multimodal landmarks into higher-order schemas; and generate counterfactual video scenarios during off-task periods by perturbing the geodesic trajectories while maintaining reversibility bounds.

6. The computer system of claim 1, wherein generating the synthetic video output comprises:

employing a Lorentzian autoencoder with pseudo-Riemannian metric to preserve temporal causality;

traversing multiple axes including spatial, temporal, spectral, and semantic dimensions; and applying correlation networks to enhance spatiotemporal consistency across generated frames.

7. The computer system of claim 1, wherein the heterogeneous sensor inputs comprise at least two of: distributed acoustic sensing fiber optic data, electric submersible pump telemetry, sonar or radar returns, thermal imaging data, internet-of-things sensor streams, and geospatially-tagged textual annotations.

8. The computer system of claim 1, wherein the software instructions further:

federate the multimodal landmarks across multiple computer systems through fiber transport maps;

validate federated exchanges through round-trip audit with bounded residual error; and synchronize the synthetic video output generation across the federated computer systems for shared situational awareness.

9. The computer system of claim 1, wherein validating the reversibility of the generated synthetic video comprises:

computing reverse displacement vectors using logarithmic maps from the journaled geometric state;

measuring residual error between forward projection and reverse navigation paths; and triggering corrective refinement when the residual error exceeds a defined tolerance threshold.

10. A computer-implemented method comprising:

maintaining a persistent cognitive substrate incorporating a latent manifold with multimodal geometric representations;

encoding heterogeneous sensor inputs from a plurality of modalities into modality-specific embedding subspaces within the latent manifold;

projecting the modality-specific embeddings into a unified multimodal latent space through cross-modal projection operators that map between modality subspaces;

establishing multimodal landmarks as geometric convergence points where heterogeneous sensor signals coalesce within the unified latent space;

computing geodesic trajectories through the unified latent space guided by the multimodal landmarks while maintaining reversibility through journaled geometric state;

generating synthetic video output by projecting the geodesic trajectories into visual representations, wherein the synthetic video is derived from the multimodal sensor inputs rather than reconstruction of existing video data;

validating reversibility of the generated synthetic video by computing round-trip residuals between forward projection and reverse navigation paths; and persisting the multimodal landmarks and generated trajectories across system sessions through a thought cache that maintains the persistent cognitive substrate.

11. The method of claim 10, wherein the cross-modal projection operators comprise:

an acoustic-to-visual operator that maps acoustic sensor data from an acoustic embedding subspace to a visual manifold;

a thermal-to-visual operator that maps thermal sensor data from a thermal embedding subspace to the visual manifold; and a text-to-anchor operator that projects textual metadata into semantic anchors within the visual manifold.

12. The method of claim 10, wherein each multimodal landmark is defined by minimizing a weighted energy functional that computes a geometric center based on representative latent points from each modality, weighting coefficients capturing relative salience of each modality, and geodesic distances within the latent manifold.

13. The method of claim 10, further comprising:

maintaining a manifold journal that records geometric state at each traversal step including metric tensors, connection coefficients, tangent displacements, and semantic anchors; and enabling cryptographic verification of navigation paths through hash-linked journal entries.

14. The method of claim 10, further comprising:

executing sleep-state consolidation operations that strengthen frequently co-activated multimodal landmarks, prune multimodal landmarks with low recurrence, and merge proximate multimodal landmarks into higher-order schemas; and generating counterfactual video scenarios during off-task periods by perturbing the geodesic trajectories while maintaining reversibility bounds.

15. The method of claim 10, wherein generating the synthetic video output comprises:

employing a Lorentzian autoencoder with pseudo-Riemannian metric to preserve temporal causality;

traversing multiple axes including spatial, temporal, spectral, and semantic dimensions; and applying correlation networks to enhance spatiotemporal consistency across generated frames.

16. The method of claim 10, wherein the heterogeneous sensor inputs comprise at least two of:

distributed acoustic sensing fiber optic data, electric submersible pump telemetry, sonar or radar returns, thermal imaging data, internet-of-things sensor streams, and geospatially-tagged textual annotations.

17. The method of claim 10, further comprising:

federating the multimodal landmarks across multiple computer systems through fiber transport maps;

validating federated exchanges through round-trip audit with bounded residual error; and synchronizing the synthetic video output generation across the federated computer systems for shared situational awareness.

18. The method of claim 10, wherein validating the reversibility of the generated synthetic video comprises: computing reverse displacement vectors using logarithmic maps from the journaled geometric state; measuring residual error between forward projection and reverse navigation paths; and triggering corrective refinement when the residual error exceeds a defined tolerance threshold.

* * * * *